(12) United States Patent
Love et al.

(10) Patent No.: US 12,705,494 B2
(45) Date of Patent: Aug. 11, 2026

(54) MACHINE LEARNING NETWORKS, ARCHITECTURES AND TECHNIQUES FOR DETERMINING OR PREDICTING DEMAND METRICS IN ONE OR MORE CHANNELS

(71) Applicant: SURGETECH M LLC, Lago (PT)

(72) Inventors: Michael Love, Marble Falls, TX (US); Blake Love, Austin, TX (US); Tiago Soromenho, Austin, TX (US); Alexander Starks, Austin, TX (US); Matthew Paff, Round Rock, TX (US)

(73) Assignee: MARROW IP LLC, Wilmington, DE (US)

( * ) Notice: Subject to any disclaimer, the term of this patent is extended or adjusted under 35 U.S.C. 154(b) by 0 days.

(21) Appl. No.: 19/241,892

(22) Filed: Jun. 18, 2025

(65) Prior Publication Data

US 2025/0315681 A1 Oct. 9, 2025

Related U.S. Application Data

(63) Continuation of application No. 18/244,585, filed on Sep. 11, 2023, now Pat. No. 12,380,335, which is a (Continued)

(51) Int. Cl.
*G06N 3/088* (2023.01)
*G06N 3/0442* (2023.01)
(Continued)

(52) U.S. Cl.
CPC ........... *G06N 3/088* (2013.01); *G06N 3/0442* (2023.01); *G06Q 10/087* (2013.01); *G06Q 30/0202* (2013.01); *G06Q 30/0206* (2013.01)

(58) Field of Classification Search
CPC ..... G06N 3/088; G06N 3/0442; G06Q 10/087
See application file for complete search history.

(56) References Cited

U.S. PATENT DOCUMENTS 8,676,615 B2 * 3/2014 Callaghan .......... G06Q 30/0643 348/222.1
11,544,724 B1 * 1/2023 Wick ................ G06Q 30/0202
(Continued)

FOREIGN PATENT DOCUMENTS

CN 114169612 A * 3/2022 ........... G06Q 10/083
JP 2020201993 A * 12/2020
(Continued)

OTHER PUBLICATIONS

Punia et al. "Deep learning with long short-term memory networks and random forests for demand forecasting in multi-channel retail", 2020, p. 26.*

*Primary Examiner* — Kamran Afshar
*Assistant Examiner* — Gwynevere A Deterding
(74) *Attorney, Agent, or Firm* — Kevin Paganini, Esq.

(57) ABSTRACT

This disclosure relates to artificial intelligence (AI) and machine learning networks for predicting or determining demand metrics across multiple channels. An analytics platform can receive channel events from multiple channels corresponding to geographic areas, and channel features related to demand conditions in the channels can be extracted from the channel events. During a training phase, the channel features can be accumulated into one or more training datasets for training one or more demand prediction models. The one or more demand prediction models can be trained to predict or determine demand metrics for each of the channels. The demand metrics can indicate or predict demand conditions based on the current conditions in the channels and/or based on future, predicted conditions in the channels. Other embodiments are disclosed herein as well.

17 Claims, 9 Drawing Sheets

Related U.S. Application Data continuation of application No. 18/108,040, filed on Feb. 10, 2023, now Pat. No. 11,790,240.

(51) Int. Cl.

| | |
|---|---|
| ***G06Q 10/087*** | (2023.01) |
| ***G06Q 30/0201*** | (2023.01) |
| ***G06Q 30/0202*** | (2023.01) |

(56) References Cited

U.S. PATENT DOCUMENTS

| | | | | |
|---|---|---|---|---|
| 2009/0099879 | A1 * | 4/2009 | Ouimet | G06Q 30/06 705/7.12 |
| 2014/0222518 | A1 * | 8/2014 | Adkins | G06Q 50/12 705/7.35 |
| 2017/0308846 | A1 * | 10/2017 | de Mars | G06N 5/04 |
| 2020/0160718 | A1 * | 5/2020 | Saleh | G08G 1/202 |
| 2023/0054993 | A1 * | 2/2023 | Shah | G16H 10/60 |

FOREIGN PATENT DOCUMENTS

| | | | | |
|---|---|---|---|---|
| JP | 2023089960 A | * | 6/2023 | G06Q 30/0202 |
| KR | 20010069590 A | * | 7/2001 | G06Q 50/40 |
| KR | 20210008907 A | * | 1/2021 | G06Q 30/0206 |

* cited by examiner

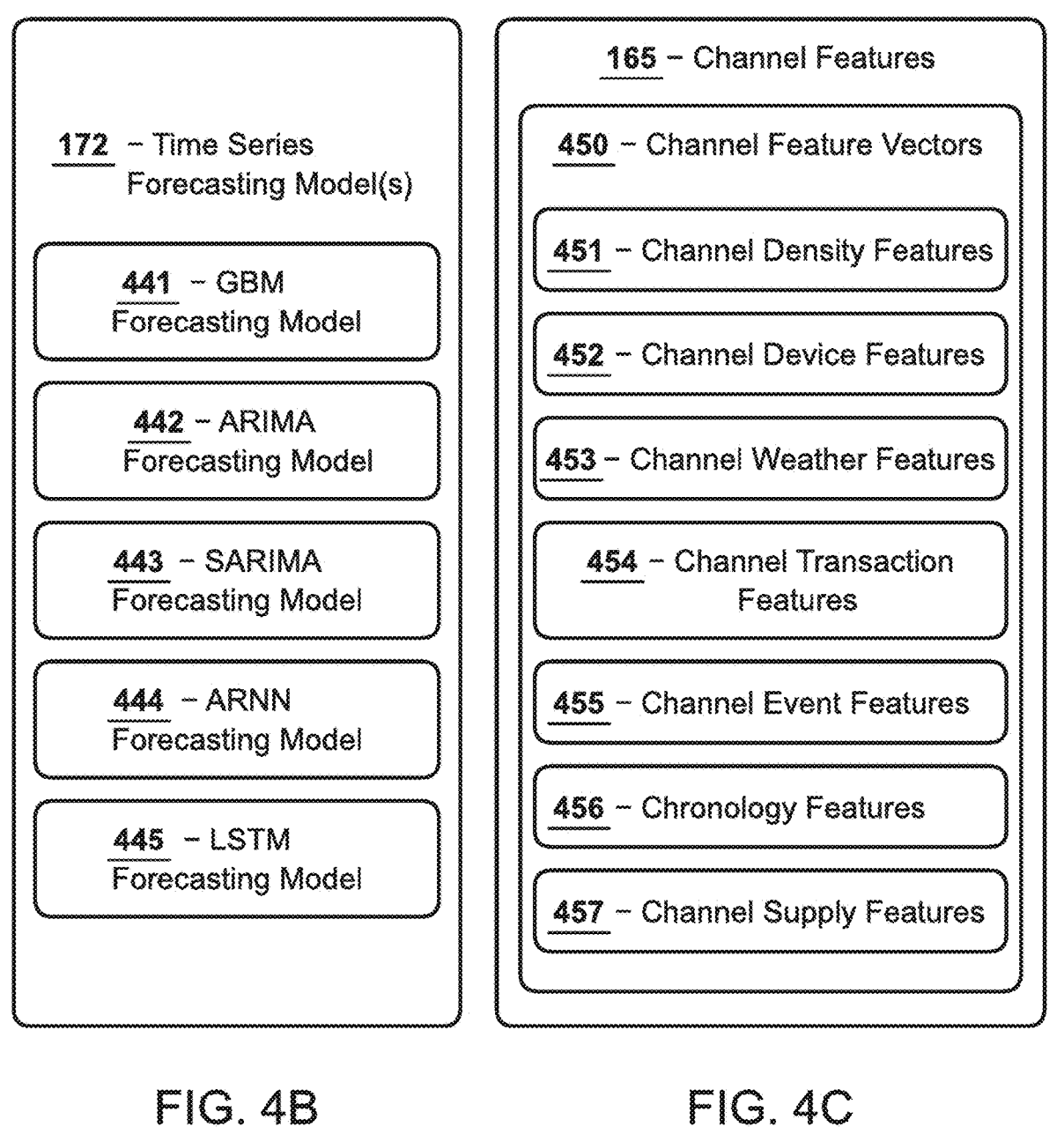

172 – Time Series Forecasting Model(s)

441 – GBM Forecasting Model

442 – ARIMA Forecasting Model

443 – SARIMA Forecasting Model

444 – ARNN Forecasting Model

445 – LSTM Forecasting Model

FIG. 4B

165 – Channel Features

450 – Channel Feature Vectors

451 – Channel Density Features

452 – Channel Device Features

453 – Channel Weather Features

454 – Channel Transaction Features

455 – Channel Event Features

456 – Chronology Features

457 – Channel Supply Features

FIG. 4C

MACHINE LEARNING NETWORKS, ARCHITECTURES AND TECHNIQUES FOR DETERMINING OR PREDICTING DEMAND METRICS IN ONE OR MORE CHANNELS

CROSS-REFERENCE TO RELATED APPLICATIONS

This application is a continuation of U.S. patent application Ser. No. 18/244,585 filed on Sep. 11, 2023, which is a continuation of U.S. patent application Ser. No. 18/108,040 filed on Feb. 10, 2023. The contents of the above-identified applications are herein incorporated by reference in their entirety.

TECHNICAL FIELD

This disclosure is related to artificial intelligence (AI) and machine learning networks, architectures, and techniques for predicting or determining demand metrics across multiple channels.

BACKGROUND

Predicting or determining demand for products and/or services in a geographic region is a technically, complex challenge. Many different variables can affect the level of demand for the product and/or services in a given geographic region. For example, the demand in a geographic region can vary based on a density of individuals located in the region, weather conditions in the region, and events (e.g., seminars, concerts, conferences, etc.) occurring in the region. Further, variations in the demand can be attributed to temporal factors, such as variations that occur at particular times of a day (e.g., mornings, afternoon, and evenings) or particular days of a week (e.g., weekdays and weekends), and variations that occur during particular seasons or during certain holidays. Many other variables also can impact the demand in a geographic region.

Further difficulties associated with determining or predicting demand can be attributed to the fact that certain variables affect or influence particular geographic regions more severely than other geographic regions. For example, rainy or snowy weather conditions may significantly lower demand in certain regions (e.g., such as those that typically experience moderate or sunny weather), and may have little or no impact on demand in other regions (e.g., such as those that regularly experience rain or snow). Likewise, certain holidays may be celebrated in certain geographic regions resulting in a spike in demand during the holiday season, but may not be celebrated in other geographic regions, thus having little or no impact on the demand in these regions.

BRIEF DESCRIPTION OF DRAWINGS

To facilitate further description of the embodiments, the following drawings are provided, in which like references are intended to refer to like or corresponding parts, and in which:

FIG. 4B is a block diagram illustrating exemplary time series forecasting models according to certain embodiments;

FIG. 4C is a block diagram illustrating exemplary channel features according to certain embodiments;

Figure 1A:
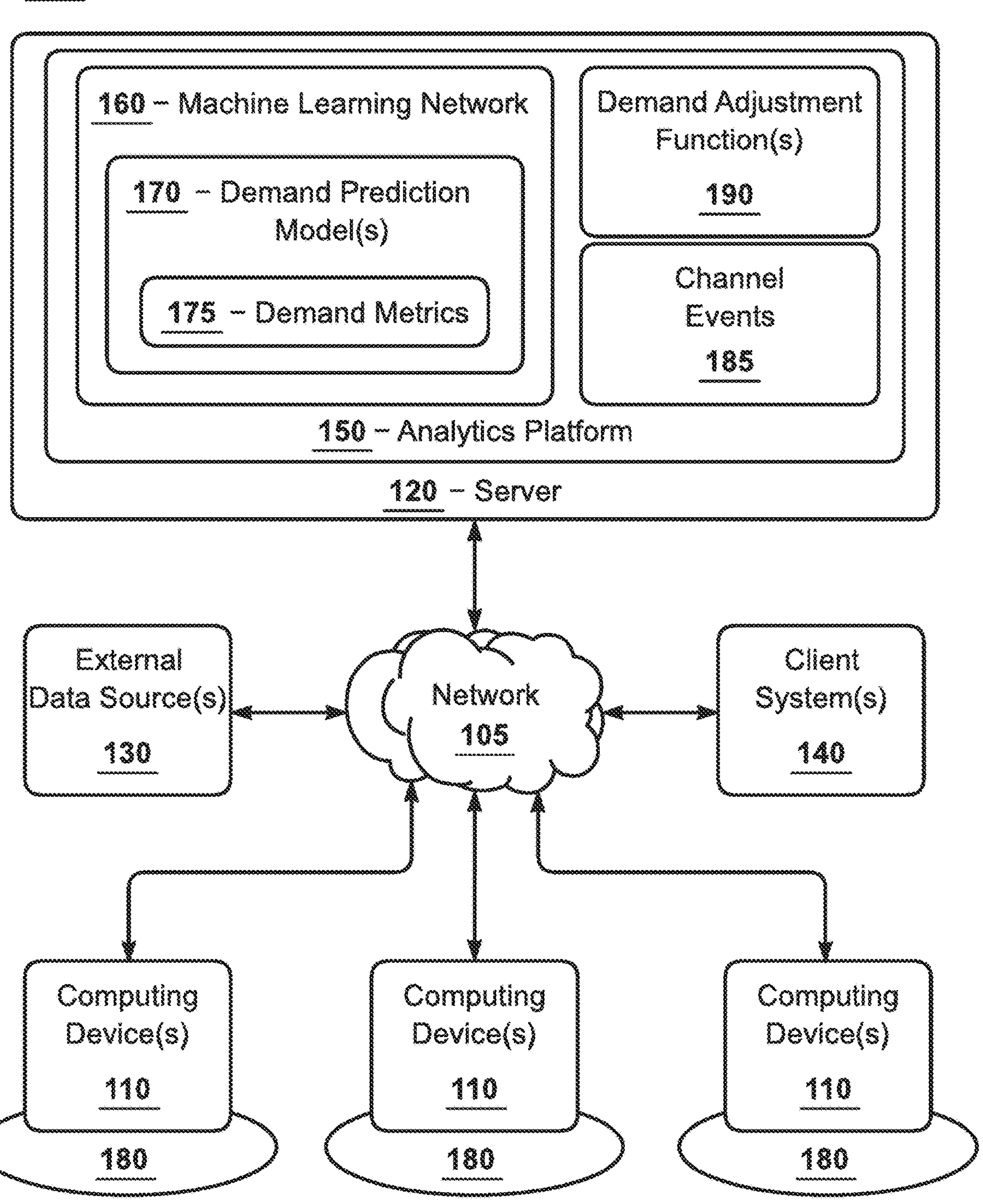
FIG. 1A is a diagram of an exemplary system according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "upper," "lower," "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the systems, methods, and/or articles of manufacture described herein are, for example, capable of operation in other orientations than those illustrated or otherwise described herein.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION OF EXEMPLARY EMBODIMENTS

The present disclosure relates to systems, methods, apparatuses, and computer program products that include machine learning and artificial intelligence (AI) networks configured to generate demand metrics across multiple channels corresponding to geographic areas. In certain embodiments, an analytics platform can be configured to monitor conditions corresponding to each of the channels, and a machine learning network generates demand metrics corresponding to each of the channels. The machine learning network can include one or more demand prediction models configured to generate or predict real-time demand metrics based on current conditions in the channels. The machine learning network also can include one or more demand prediction models configured to generate or predict demand metrics for future time periods. As described in further detail below, the demand metrics generated by the demand prediction models can be used for various purposes. In some cases, the demand metrics can be utilized to execute surge pricing functions that automatically adjust prices for one or more inventory items in the channels. Additionally, or alternatively, the demand metrics can be utilized to execute inventory management functions that dynamically adjusts allocations of inventory items within or across the channels.

The configurations of the demand prediction models can vary. In certain embodiments, the demand prediction models can include one or more anomaly detection models that are trained to detect patterns indicative of current or real-time demand conditions within the channels. Exemplary anomaly detection models can be implemented using change point detection (CPD), outlier detection (OD), and/or classification techniques to derive demand metrics corresponding to the channels. The demand prediction models also can include one or more time series forecasting models that are trained to predict future demand conditions within the channels. Exemplary time series forecasting models can utilize gradient boosting machine (GBM), autoregressive integrated moving average (ARIMA), seasonal autoregressive integrated moving average (SARIMA), autoregressive recurrent neural network (ARNN), and/or long short-term memory (LSTM) techniques to predict demand metrics corresponding to the channels the channels. These and other exemplary configurations of the demand prediction models are described throughout the disclosure.

In certain embodiments, the machine learning network can execute multiple demand prediction models that cooperate to jointly to predict demand metrics for the channels. This can be advantageous because a multitude of variables can impact the demand conditions in a given channel, and a given demand prediction model may be well suited to analyze some of the variables and less optimal for analyzing other variables. For example, certain types of demand prediction models can be well suited to analyze the impact of population density changes on demand conditions in the channel, while other types of demand prediction models can be more optimal for analyzing the impact of weather or events on demand conditions within the channel. Additionally, the demand prediction models can be configured to monitor or detect different types of anomalies that are rely more heavily on certain variables and less heavily on other variables. Given such, a plurality of demand prediction models can be utilized to analyze the conditions in a given channel, each of which is trained to analyze a separate set of variables and/or anomalies that can affect the demand in the channel. The outputs of the demand prediction models can be combined, or jointly considered, in generating or predicting the demand metrics for the channel.

The demand prediction models can be trained using various supervised, unsupervised, and/or semi-supervised training procedures. For example, certain demand models that are implemented using change point detection or outlier detection techniques may be trained in an unsupervised fashion using training features that are extracted from channel events aggregated by the analytics platform over a historical time period. Other demand prediction models, such as those that are implemented using classification or times series forecasting techniques, can be trained in a supervised or semi-supervised fashion using training features that are annotated with demand indicator labels identifying demand levels in the channels based on given sets of channel features derived from a historical time period. These and other training techniques are described in further detail below.

In certain embodiments, the demand prediction models can be trained on a channel-specific basis using training features that are specific to each channel. As explained above, different variables can affect the demand in each channel, and the impact or severity of each variable can differ across channels. To account for these variations, the demand prediction models can be separately trained on a channel-specific basis using training features that are specific to that channel (e.g., using channel features that are derived from channel events corresponding to the channel in a historical time period). Training the demand prediction models in this manner can significantly improve the accuracy of the demand metrics generated or predicted for each of the channels.

The channel features utilized by the machine learning network can be derived, at least in part, from channel events that are received by the analytics platform. The analytics platform can receive and monitor various types of channel events for each of the channels, and the channel events can generally include any data relating to monitoring present or future conditions associated with the channels. For example, in some embodiments, the channel events can include data indicating the locations of individuals (or devices operated by individuals) within each channel, as well as intra-channel and inter-channel movements of the individuals. The channel events for each channel also can include data relating to transactions conducted within the channel, current or future weather conditions within the channel, merchants located within the channel, supply information for one or more inventory items offered within the channel, events (e.g., concerts, conventions, sporting games, etc.) occurring or schedule to occur within the channel, and temporal information related to the channel. The channel events can include many additional attributes related to the channels themselves and/or individuals located within the channel. Further examples of channel events are described throughout this disclosure.

For each channel, the machine learning network can extract channel features from the channel events collected by the analytics platform. The channel features can generally include any data that can impact or affect demand conditions in a channel. For example, the channel features can be extracted to indicate or predict a density or amount of individuals located in each channel. Additionally, the channel features also can comprise temporal features (e.g., which may identify a season, a day of a week, a time of day, occurrences of holidays, etc.) that affect the demand. Additional channel features can include data relating to available inventory supplies, weather conditions, scheduled events, and other factors that can affect the demand conditions in each channel. Further examples of channel features are described below.

The channel features for each channel can be utilized by one or more demand prediction models to generate or predict demand metrics corresponding to each of the channels. Each demand metric can indicate or predict the demand for a channel, the demand for a vertical included in the channel, and/or the demand for one or more inventory items associated with the channel. In some embodiments, each demand metric can be based on a consideration of the supply and demand conditions in the channel, the supply and demand conditions for a vertical within the channel, and/or the supply and demand conditions for one or more inventory items within the channel. The demand metrics can include real-time metrics relating to the current or real-time demand in the channels (or verticals or inventory items corresponding to the channels). The demand metrics also can predict the demand for the channels (or verticals or inventory items corresponding to the channels) in future time periods. Examples of these real-time and predictive metrics are provided throughout this disclosure.

During a training phase of the machine learning network, separate sets of channel features can be collected or aggregated to create one or more training data sets that are utilized to train one or more of the demand prediction models described herein. Additionally, for some models that learn via supervised training, the channel features can be annotated with demand indicator labels. During an operational or deployment phase of the machine learning network, the channel features can be provided to one or more pre-trained demand prediction models to generate the demand metrics.

One or more demand adjustment functions can be executed for each channel based on the demand metrics generated for the channel and/or based on demand fluctuations detected in the channel. In general, a demand adjustment function can represent a function that adjusts prices or inventory allocations in a channel based, at least in part, on a demand metric generated for the channel. In certain embodiments, the one or more demand adjustment functions can be executed by the analytics platform that hosts the machine learning network. Additionally, or alternatively, the demand metrics can be provided to one or more client systems that receive the demand metrics from the analytics platform to execute the one or more demand adjustment functions.

One exemplary demand adjustment function can include a pricing function that determines prices for one or more inventory items based on the demand metrics. For example, in some cases, the demand metrics can be utilized by a surge pricing function to dynamically adjust prices for one or more inventory items in each of the channels based, at least in part, on the demand metrics corresponding to the channels. Another exemplary demand adjustment function includes an inventory management function that utilizes the demand metrics to manage or adjust inventories (e.g., such as to dynamically reallocate inventory items among or within channels and/or initiate ordering of additional inventory items) based, at least in part, on the demand metrics. The demand metrics can be leveraged by other useful functions as well.

The technologies described herein provide a variety of benefits and advantages. Amongst other things, AI and machine learning technologies can determine or predict demand metrics in the channels with greater accuracy and precision. In some embodiments, the increased accuracy and precision of demand metrics can be attributed, at least in part, to the usage of multiple demand prediction models, each of which is selected to analyze a set of demand-impacting variables and/or anomalies that are well suited for the corresponding model. Additionally, in some embodiments, the increased accuracy and precision of the demand metrics also can be attributed, at least in part, to the manner in which the demand prediction models are trained. For example, as discussed in further detail below, the demand prediction models may be separately trained on a channel-specific basis using training channel features that are specifically derived from each channel during a historical time period. Training the demand prediction models in this manner can enable the models to account for the severity that each channel feature has on a given channel (e.g., to account for scenarios in which certain training features have a larger impact on demand conditions in one channel, while affecting demand conditions to a lesser extent in other channels).

Further benefits can be attributed to the usefulness of the demand metrics, which can be leveraged for many different purposes and functions. For example, in some scenarios, the demand metrics can be utilized by client systems to automate pricing functions and/or inventory functions in real-time or near real-time based on the current conditions within the channels. Additionally, the demand metrics can be utilized by client systems (or affiliated merchants) to prepare for predicted future conditions within the channels. In some cases, the client systems can be interfaced with the analytics platform (e.g., via an application programming interface or API) to enable immediate access to the demand metrics on a continuous basis, thereby facilitating a seamless adjustment of pricing and/or inventory allocations in real-time or near real-time.

Additional benefits can be attributed to embodiments that utilize the demand metrics to automate surge pricing functions. Client applications that employ surge pricing functionalities can better mitigate imbalances between an available supply of inventory items and a demand for those inventory items. The demand metrics can be leveraged to dynamically adjust prices for the inventory items, thereby enabling providers of the client applications to reduce high-demand peaks.

The technologies discussed herein can be used in a variety of different contexts and environments. Some useful applications of these technologies are in the context of adjusting pricing and/or inventory allocations for merchant entities, such as those that provide ride hailing services, transportation services (e.g., ticket bookings for buses, trains, airplanes, cruises, boats, etc.), lodging accommodations (e.g., affiliated with hotels, motels, short-term home stays, rental services, property purchases, etc.), parking services (e.g., affiliated with parking garages, parking lots, etc.), restaurant services, tavern services, entertainment services, etc. For example, the technologies disclosed herein can provide merchant-specific insights and metrics relating to the current and future demand for products and services offered by these entities. These metrics can be used by those entities to automatically or manually adjust settings for pricing systems (e.g., surge pricing systems), inventory systems, and/or other operations.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
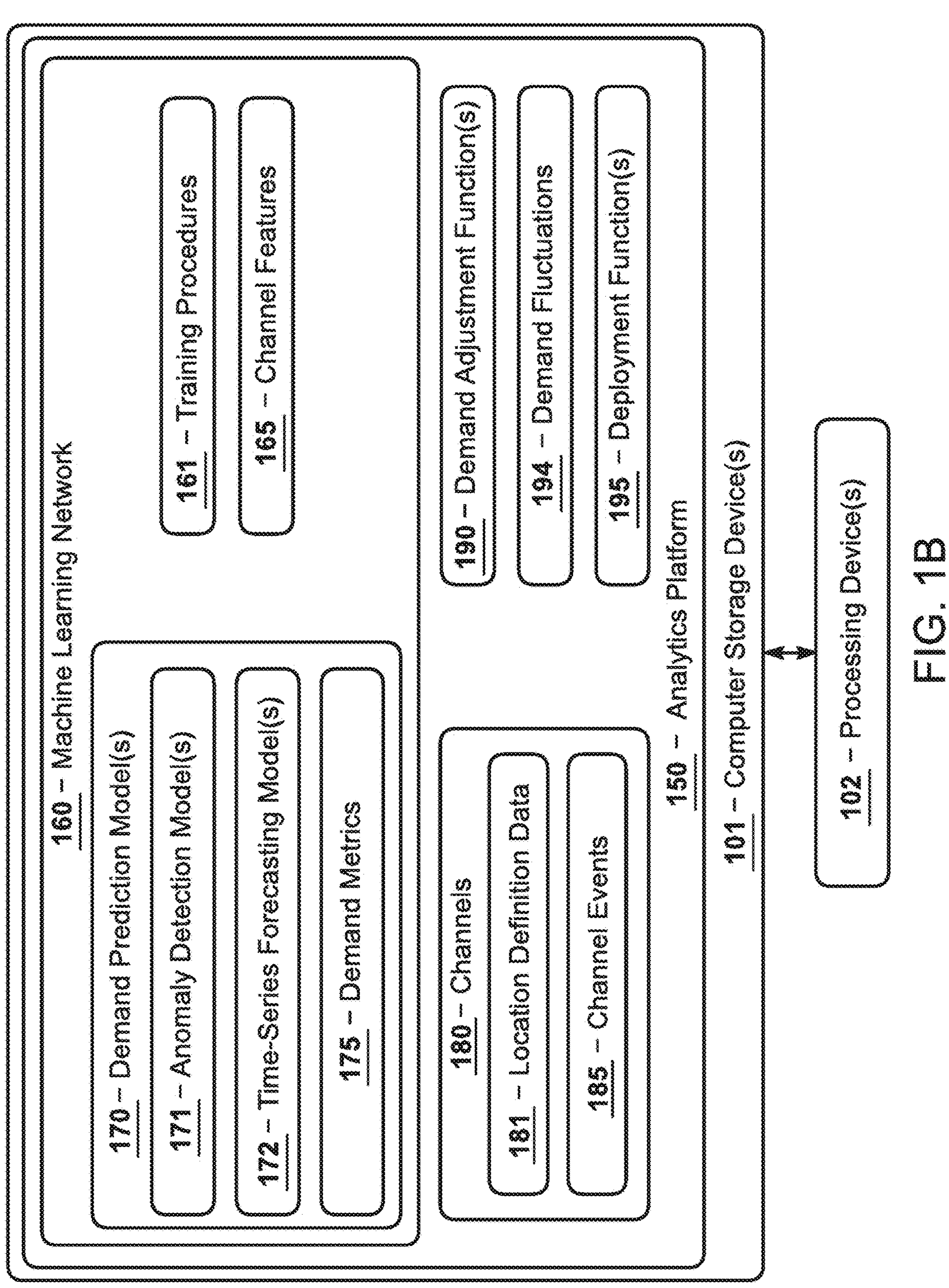
FIG. 1B is a block diagram illustrating exemplary features of analytics platform according to certain embodiments.

FIG. 1A is a network diagram of an exemplary system 100 in accordance with certain embodiments. The system 100 includes, inter alia, an analytics platform 150 that utilizes an AI or machine learning network 160 to generate or derive demand metrics 160 for one or more channels 180. FIG. 1B is a block diagram illustrating additional features, components, and/or functions associated with the analytics platform 150 and machine learning network 160. FIGS. 1A and 1B are jointly discussed below.

The system 100 comprises one or more computing devices 110, one or more servers 120, one or more external data sources 130, and one or more client systems 140 that are in communication over a network 105. An analytics platform 150 comprising a machine learning network 160 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1A, including the one or more computing devices 110, one or more servers 120, one or more external data sources 130, and one or more client systems 140, and analytics platform 150 can be configured to communicate directly with each other and/or over the network 105 via wired or wireless communication links, or a combination of the two. Each of the computing devices 110, servers 120, external data sources 130, client systems 140, and analytics platform 150 can include one or more communication devices, one or more computer storage devices 101, and one or more processing devices 102 (FIG. 1B) that are capable of executing computer program instructions.

The one or more computer storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more computing storage devices 101 may be physical, non-transitory mediums. The one or more computer storage devices 101 can store, inter alia, instructions associated the implementing the functionalities of the analytics platform 150 and machine learning network 160 described herein.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices 101 including, but not limited to, instructions associated the implementing the functionalities of the analytics platform 150 and machine learning network 160 described throughout this disclosure.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable some or all of the computing devices 110, servers 120, external data sources 130, client systems 140, and/or analytics platform 150 to be connected to the Internet and/or other network. The modem devices can permit bi-directional communication between the Internet (and/or other network) and the computing devices 110, servers 120, external data sources 130, client systems 140, and/or analytics platform 150. In certain embodiments, one or more router devices and/or access points may enable the computing devices 110, servers 120, external data sources 130, client systems 140, and/or analytics platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, external data sources 130, client systems 140, and/or analytics platform 150 to access the Internet and/or other networks.

In certain embodiments, the computing devices 110 may represent mobile devices (e.g., smart phones, personal digital assistants, tablet devices, vehicular computing devices, wearable devices, or any other device that is mobile in nature), desktop computers, laptop computers, and/or other types of devices. The one or more servers 120 may generally represent any type of computing device, including any of the aforementioned computing devices 110. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110, external data sources 130, client systems 140, and/or other devices over the network 105 (e.g., over the Internet).

In certain embodiments, the analytics platform 150 (including the machine learning network 160) can be stored on, and executed by, the one or more servers 120. Additionally, or alternatively, the analytics platform 150 can be stored on, and executed by, the one or more computing devices 110 and/or one or more client systems 140. The analytics platform 150 can be executed be stored on, and executed, by other devices as well.

In some embodiments, the analytics platform 150 also can be stored as a local application on a computing device 110, or interfaced with a local application stored on a computing device 110, to implement the techniques and functions described herein. The computing device 110 may be part of client system 140 in some scenarios.

The client systems 140 can generally correspond to third-party systems, networks, and/or devices that access the analytics platform 150 and/or utilize the data (including the demand metrics 175) generated by the analytics platform 150. For example, the client systems 140 can be operated and managed by individuals, businesses, and/or other entities that utilize the analytics platform 150 (including the demand metrics 175 generated by the analytics platform 150) to improve the functionalities of one or more systems and/or one or more applications.

In certain embodiments, each of the client systems 140 can register and/or create a user account with the analytics platform 150 to obtain access to the data and services provided by the analytics platform 150. The client systems 140 can be operated by, or associated with, individuals or businesses from any industry or vertical including, but not limited, to those that offer ride hailing services, hotel or lodging accommodations, parking space availability, tavern services, and restaurant services. As explained in further detail below, the client systems 140 can utilize the demand metrics 185 (and other data provided by the analytics platform 150) to enhance and improve business operations in various ways.

Each of the client systems 140 may include one or more computing devices 110 that enable the client systems 140 to access the analytics platform 150 over the network 105. In some cases, one or more of the client systems 140 may include sophisticated technological infrastructures, such those that include enterprise systems, servers 120, virtual private networks (VPNs), intranets, etc. The computing devices 110, servers 120, and/or other devices associated with each client system 140 can store and execute various applications (e.g., such as ride hailing applications, lodging booking applications, dining reservation applications, ticket purchasing applications, pricing applications, inventory management applications, etc.). The client systems 140 and associated applications can leverage the data (e.g., demand metrics 185) generated by the analytics platform 150 in various ways.

In certain embodiments, the analytics platform 150 can be integrated with (or can communicate with) various applications hosted by the client systems 140 including, but not limited to, applications that provide products or services for transportation services (e.g., ride hailing services, ride sharing services, vehicle rental services, and/or ticket scheduling services for buses, trains, planes, boats, and/or other modes of transportation), lodging accommodations (e.g., booking services for hotels, motels, short-term home stays, rental services, property purchases, etc.), parking space services (e.g., booking services for parking garages, parking lots, etc.), and scheduling services (e.g., reservation services for restaurants, bars, sporting events, concerts, ticketed events, etc.). In certain embodiments, the analytics platform 150 additionally, or alternatively, can be integrated with (or can communicate with) e-commerce applications, pricing applications, inventory management applications, and/or other applications.

The aforementioned applications and/or other applications, each of which may be integrated or interfaced with the analytics platform 150, can be stored on one or more client systems 140 in some embodiments. For example, the aforementioned applications and/or other applications can be stored on one or more computing devices 110 and/or one or more servers 120 associated with one or more client systems 140.

As discussed throughout this disclosure, the analytics platform 150 can provide functions associated with receiving, recording, storing, and processing channel events 185 relating to various conditions within a plurality of channels 180. This machine learning network 160 associated with the analytics platform 150 utilize the channel events 185 to generate demand metrics 175 corresponding to each of the channels 180. Additionally, as described in further detail below, the demand metrics 175 can be utilized by the analytics platform 150 and/or one or more client systems to implement demand adjustment functions 190, such as surge pricing functions and/or inventory management functions.

Each demand metric 175 can represent a value or indicator that determines or predicts the demand for a channel 180, the demand for a vertical included in the channel 180, and/or the demand for one or more inventory items offered in the channel 180. In some cases, each demand metric 175 may represent a value or indicator that is generated based on a consideration of the supply and demand conditions in the channel 180, the supply and demand conditions for a vertical within the channel 180, and/or the supply and demand conditions for one or more inventory items offered within the channel 180.

The demand metrics 175 can be represented in various ways. In some scenarios a demand metric 175 may be a value between zero and one that identifies a level of demand in a given channel 180. Additionally, or alternatively, a demand metric 175 can include a binary indicator (e.g., 0 or 1) to indicate whether or not a demand surge is detected or predicted above a threshold for a given channel 180. Additionally, or alternatively, the demand in a given channel can be modeled based on tiers of severity (e.g., a scale ranging from 0-5) and the demand metric 175 can identify a tier (e.g., such that a value 5 would indicate a massive surge in demand and a value 0 would indicate little or no demand). The demand metrics 175 can represent the detected or predicted demand in other ways as well.

Demand metrics 175 can be generated for both current and future timeframes. For example, some of the demand metrics 175 can include real-time demand metrics indicating the current demand for the channels 180 (or verticals or inventory items corresponding to the channels 180). Additionally, some of the demand metrics can predict the demand for the channels 180 (or verticals or inventory items corresponding to the channels 180) in future time periods. In certain embodiments, the machine learning network 160 can utilize separate demand prediction models 170 to generate the demand metrics for current and future time periods.

In certain embodiments, the demand metrics 175 generated by the machine learning network can be utilized to detect or predict demand fluctuations 194 across the channels 180. A demand fluctuation 194 can generally indicate an upward or downward change in a demand for a given channel, vertical, or inventory item.

The manner in which a demand fluctuation 194 in a channel is detected can vary. In one example, a demand fluctuation 194 in a channel can be detected by analyzing a rate of change between a first demand metric 175 for the channel and a second demand metric 175 for the channel, and comparing the rate of change to a threshold rate to detect an upward fluctuation or downward fluctuation in the channel 180. In another example, a demand fluctuation 175 in a channel 180 can be detected by analyzing a change in the volatility of demand within the channel 180, and comparing the volatility rate of change to a threshold rate to detect an upward or downward fluctuation in the channel 180. In a further example, a demand fluctuation 175 in a channel 180 can be detected by comparing a demand prediction 175 to a threshold that identifies a benchmark or expected demand for the channel. Demand fluctuations can be identified in other ways as well.

Each channel 180 can represent, or correspond to, a specific geographic region or area. The scope or region associated with each channel 180 can vary significantly. For example, macro-level channels 180 can correspond to large geographic areas covering entire continents, countries, and/or states. Other more micro-level channels 180 can correspond to counties, cities, and/or towns. Additional channels 180 can correspond to specific regions, neighborhoods, areas, or the like within cities or towns. In many cases, the channels 180 can include overlapping geographic areas (e.g., such that a channel corresponding to a city can be included within a channel corresponding to a state, and the channel corresponding to the state can be included in a channel corresponding to a country).

The analytics system 150 can store location definition data 181 that defines the geographic region associated with each channel 180. For example, in certain embodiments, the location definition data 181 can store global positioning system (GPS) coordinates for each channel 180 that precisely defines the geographic region associated with the channel 180. Additionally, or alternatively, the location definition data 181 can include geo-fencing data that defines the geographic region associated with the channel 180. In some embodiments, the analytics platform 150 can provide access to one or more GUIs that enable users to define the geographic regions associated with the channels 180.

The analytics platform 150 can receive channel events 175 corresponding to each of the channels 180 being monitored by the analytics platform 150. The types and content of the channel events 185 received and processed by the analytics platform 150 can vary. The channel events 185 can generally include any data associated with monitoring locations of individuals within a channel 180, activities occurring within the channel 180, and/or other conditions associated with the channel 180. For example, the channel events 185 can include data indicating locations of individuals (or their smart phones or mobile devices) within the channel 180, transactions conducted within the channel 180, weather conditions within the channel, and/or events (e.g., concerts, conventions, etc.) occurring within the channel 180.

The channel events 185 can be generated by, or received from, various devices, systems, and/or sources. Some of the channel events 185 can be generated by computing devices 110 (e.g., mobile devices, smart phones, wearable devices, etc.) operated by individuals within the channels 180. For example, these devices (or applications installed thereon) can generate channel events 185 indicating locations of the devices, transactions conducted using the devices, and/or other information.

Additionally, some of channel events 185 can be received one or more external data sources 130, which can include third-party websites, databases, and/or servers that provide information relating to the channels 180 and/or individuals located within the channels 180. Exemplary external data sources 130 can include websites, databases, applications, and/or servers associated with cellular device providers, weather outlets, news outlets, social media sites, governmental business registers, and/or the like. In some embodiments, these and other external data sources 130 be used to derive or generate channel events 185 relating to weather conditions within the channels 180, events occurring with the channel, locations of individuals within the channels, etc.

Figure 5:
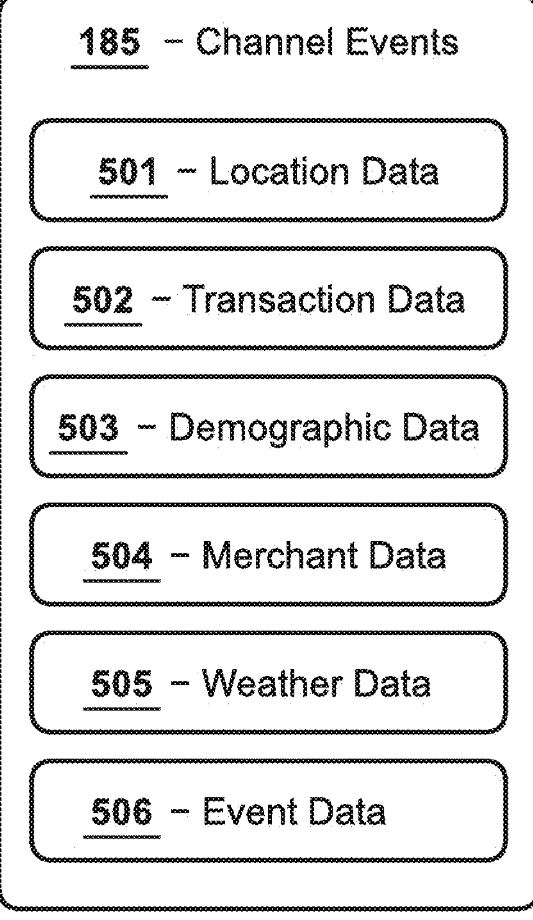
FIG. 5 is a block diagram illustrating exemplary channel events according to certain embodiments.

FIG. 5 is block diagram illustrating examples of channel events 185 that can be received by analytics platform 150 each of the channels 180. As shown, the channel events 185 can include, inter alia, location data 501, transaction data 502, user demographic data 503, merchant data 504, weather data 505, and event data 506. These exemplary channel events 185 can be received by the analytics platform 150 for each of the channels 180.

The location data 501 can indicate the current locations and/or historical locations and movements of individuals (or computing devices 110 operated by individuals) located in a channel 180. For example, the location data 501 may include GPS coordinates indicating the current locations of individuals, and previous locations of those individuals. In some embodiments, the location data 501 can be received directly from computing devices 110 operated by the individuals and/or an external data source 130, such as a cellular service provider.

The transaction data 502 can indicate purchases that are made within a channel 180 (e.g., including purchases made by individuals that are currently located within the channel 180). The transaction data 502 also may indicate transaction patterns or profiles for each of the individuals located in the channel 180 (e.g., indicating the types of products or services routinely purchased by the individual and/or the types of businesses routinely frequented by the individual). In some cases, the transaction data 502 also may indicate the channel 180 where each transaction was conducted. In some embodiments, the transaction data 502 can be received directly from computing devices 110 operated by the individuals and/or one or more external data sources 130, such third-party merchant systems, credit card service providers, digital payments providers, etc.

The demographic information 503 received for each channel 180 can include various characteristics or attributes relating to individuals within a corresponding channel 180. For example, the demographic data 503 for each individual can indicate some or all of the following: age, sex, race, ethnicity, income, marital status, occupation, education level, interests, etc. In some embodiments, the demographic information 503 can be received directly from computing devices 110 operated by the individuals and/or one or more external data sources 130, such as a social media sites, marketing or advertising services, etc.

The merchant data 504 can provide information related to merchants (e.g., businesses, vendors, etc.) located in a channel 180. For example, the merchant data 504 may identify the locations of the merchants, verticals associated with the merchants, hours of operation, company names, and products or services offered by the merchants. In some embodiments, the merchant data 504 can be received directly from computing devices 110 operated by the merchants and/or one or more external data sources 130, such as a crowd-sourced business review applications, business information databases, etc.

The weather data 505 can indicate the current weather conditions and/or historical weather conditions in a channel 180. The weather data 505 also may indicate forecasts of future weather conditions for the channel 180. In some embodiments, the weather data 505 can be received from one or more external data sources 130, such as those that provide weather forecasting services.

The event data 505 can provide information associated with events (e.g., concerts, conventions, seminars, shows, etc.) in a channel 180. The event data 505 can include information identifying ongoing events, as well as previously held or upcoming events. The event data 505 may include dates, times, locations, and venues associated with each of the events 505. In some embodiments, the event data 505 can be received directly from computing devices 110 operated by event providers and/or one or more external data sources 130, such as a social media sites, community bulletin board sites, etc.

In certain embodiments, some or all of the channel events 185 can be annotated to with timestamps or other related data that indicates when the channel event 185 was created and/or received by analytics platform 150.

The categories identified in FIG. 5A are intended to provide examples of content that may be included in channel events 185 received for each of the channels 180. However, it should be recognized that the channel events 185 can include additional categories of information or data related to the activities, individuals, entities, and/or conditions of a channel 180.

Returning to FIGS. 1A and 1B, the channel events 185 received by the analytics platform 150 can be analyzed and/or processed to extract or derive channel features 165. In many cases, the channel events 185 can include raw data that is provided in various non-uniform formats, and which includes extraneous data that is not relevant to determining demand conditions in channels 180. The channel features 165 can be extracted by filtering and/or normalizing the channel event events, and/or by deriving metrics based on the data included in the channel events 185.

During a training phase for the machine learning network 160, the channel features 165 can be aggregated into one or more training datasets that are utilized to train one or more demand prediction models 170. During an operational phase (when the machine learning network 160 is deployed and used by the analytics platform 150), the channel features 165 can be collected in real-time or near time-time for each of the channels 180, and one or more pre-trained demand prediction models 170 can utilize the channel features 165 to generate or predict demand metrics 175 for each of the channels 180.

Generally speaking, the channel features 165 can generally include any data that can influence or affect demand conditions in one or more channels 180 and/or any data that can be useful for determining or predicting the demand in one or more channels 180. For example, exemplary channel features 165 can include data indicating population densities, weather conditions, scheduled events, and/or factors that can affect demand conditions in the channels 180.

FIG. 4C is block diagram illustrating examples of channel features 165 that may be extracted or derived by the analytics platform 150. As shown, the channel events 185 can include, inter alia, channel density features 451, channel device features 452, channel weather features 453, channel transaction features 454, channel event features 455, temporal features 456, and/or channel supply features 457. These exemplary channel features 165 can be generated by the analytics platform 150 for each of the channels 180.

The channel density features 451 can indicate a density or amount of individuals located in a given channel 180. In some embodiments, the value of a channel density feature 151 can be derived, at least in part, by analyzing the channel events 185 that include location data 501, which can be utilized to identify a number of individuals (or computing devices 110 operated by individuals) located in each of the channels 180. In some cases, the number of individuals or computing devices 110 can be totaled or summed to determine the value of the channel density feature 451.

The channel device features 452 can indicate the precise locations (e.g., longitude, latitude, and attitude) of each computing device 110 in a given channel 180. In some embodiments, the channel device features 452 can be derived, at least in part, by analyzing the channel events 185 that include location data 501.

The channel weather features 453 can indicate the actual or predicted weather conditions in a channel 180 for a given time period. In some embodiments, the channel weather features 453 can be derived, at least in part, by analyzing the channel events 185 that include weather data 505. In some embodiments, a channel weather feature 452 can include values that represents the specific weather conditions for the channel and/or the severity of the weather conditions.

The channel transaction features 454 can indicate an amount of transactions conducted in a channel 180 within a given time period (e.g., in some cases, a recent period of time relating to the previous hour or day). In some embodiments, the transaction features can correspond to transactions conducted in a specific vertical or for a specific inventory item within the time period. In some embodiments, the channel transaction features 454 can be derived, at least in part, by analyzing the channel events 185 that include transaction data 502 and/or merchant data 504.

The channel event features 455 can include various data relating to events that are occurring (or scheduled to occur) in a given channel 180. For example, for each event, the channel event features 455 can include data indicating a location of the event, a vertical associated with the event, a time when the event is held, a number of individuals attending (or expected to attend) the event, etc. In some embodiments, the channel event features 455 can be derived, at least in part, by analyzing the channel events 185 that include event data 506 and/or merchant data 504.

The temporal features 456 can include information corresponding to the time, date, seasonality, or the like. In many cases, the demand in a given channel can be affected or influenced by seasons, occurrences of holidays, or the like. Likewise, the demand in a given channel can vary on particular days of week (e.g., weekends vs. weekdays), particular times of day (e.g., mornings vs. evenings), or a particular times of month. The temporal features 456 can provide information that identifies relevant days, times, months, seasons, occurrences of holidays commonly celebrated in particular channels, and/or the like. In some cases, the temporal features 456 can be derived by the analytics platform 150 itself and/or from channel events 185 received from one or more external data sources 130.

The channel supply features 454 can indicate or predict an available supply of inventory items (or an available supply in a vertical that provides the inventory items) at a particular point in time in a channel 180. The inventory items can generally correspond to any product or service, such as those that are offered by ride hailing services (e.g., available drivers/vehicles), hotel or lodging accommodations (e.g., available rooms), parking space availability (e.g., available parking spaces), and tavern/restaurant services (e.g., available seating, reservations, food, beverages, etc.). In some embodiments, the supply features 454 can be derived from one or more client systems 140 and/or channel events 185 received from one or more external data sources 130.

The aforementioned channel features 165 are provided as examples of channel features 165 that can be generated by or derived by the analytics platform. However, it should be recognized that various other channel features 165 also could be generated or derived by the analytics platform 150. Additionally, in some scenarios, one or more of the aforementioned channel features 165 may not be utilized by the analytics platforms 150.

In some embodiments, some or all of the aforementioned channel features 165 (and/or other channel features 165) derived by the analytics platform 150 can be incorporated into channel feature vectors 450 or other similar data structures. Each channel feature vector 450 can include a plurality of different channel features 165 describing demand conditions in a channel 180 for a particular instance in time or a particular demand scenario. The machine learning network 140 can utilize the channel feature vectors 450 to generate the demand metrics 175 corresponding to the channels 180.

For example, when generating or predicting a demand metric 175 for a channel at a given point in time, one or more demand prediction models 170 included in the machine learning network 140 may receive a channel feature vector 450 comprising at least some of the following: a channel density feature 451 indicating or predicting the density of individuals in the channel at that time; one or more channel device features 452 relating to locations of computing devices 110 in the channel at that time; a channel weather feature 453 indicating or predicting weather conditions in the channel at that time; a channel transaction features 454 indicating an amount of transactions that occurred immediately preceding that time (e.g., within the previous ten minutes or hour); one or more channel event features 455 providing data relating to ongoing or scheduled events in the channel at that time; one or more temporal features 456 providing timing information relating to that time (e.g., indicating the current day of the week, time of day, season, presence of holidays, etc.); and/or channel supply features 457 indicating an available supply of inventory items in the channel at that time. As described in further detail below, the one or more demand prediction models 170 can utilize the channel feature vector 450 to generate the demand metric 450 for the channel at that point in time (which can be a current period of time or a future period of time).

Returning to FIGS. 1A and 1B, the demand prediction models 170 can utilize the channel features 165 and/or channel vectors 450 to generate or predict demand metrics 170 corresponding to the channel 180. As described in further detail below, the channel features 165 and/or channel vectors 450 also can be utilized to compile or generate training data sets that can be utilized to train one or more of the demand prediction models 170.

The configuration of the machine learning network 160 and demand prediction models 170 can vary in numerous ways. For example, various types of AI or machine learning models can be deployed, including those that comprise anomaly detection models 171 and times series forecasting models 172. Additionally, these learning models can be trained using various types of training procedures 161, including both supervised and unsupervised procedures. Further, the types of demand metrics 175 generated by the machine learning network 160 can vary, and may include demand metrics 175 that indicate or predict a current demand in the channels and/or demand metrics 175 that predict a future demand of the channels 180. These and other variations of the machine learning network 160 are described below.

In certain embodiments, the machine learning network 160 can include one or more anomaly detection models 171 that are trained to detect patterns indicative of current or real-time demand conditions within the channels 180, and to generate corresponding demand metrics 175 for the channels 180. The anomaly detection models 171 can utilize various algorithms and techniques, either independently or combination, to accomplish these tasks.

Figure 4A:
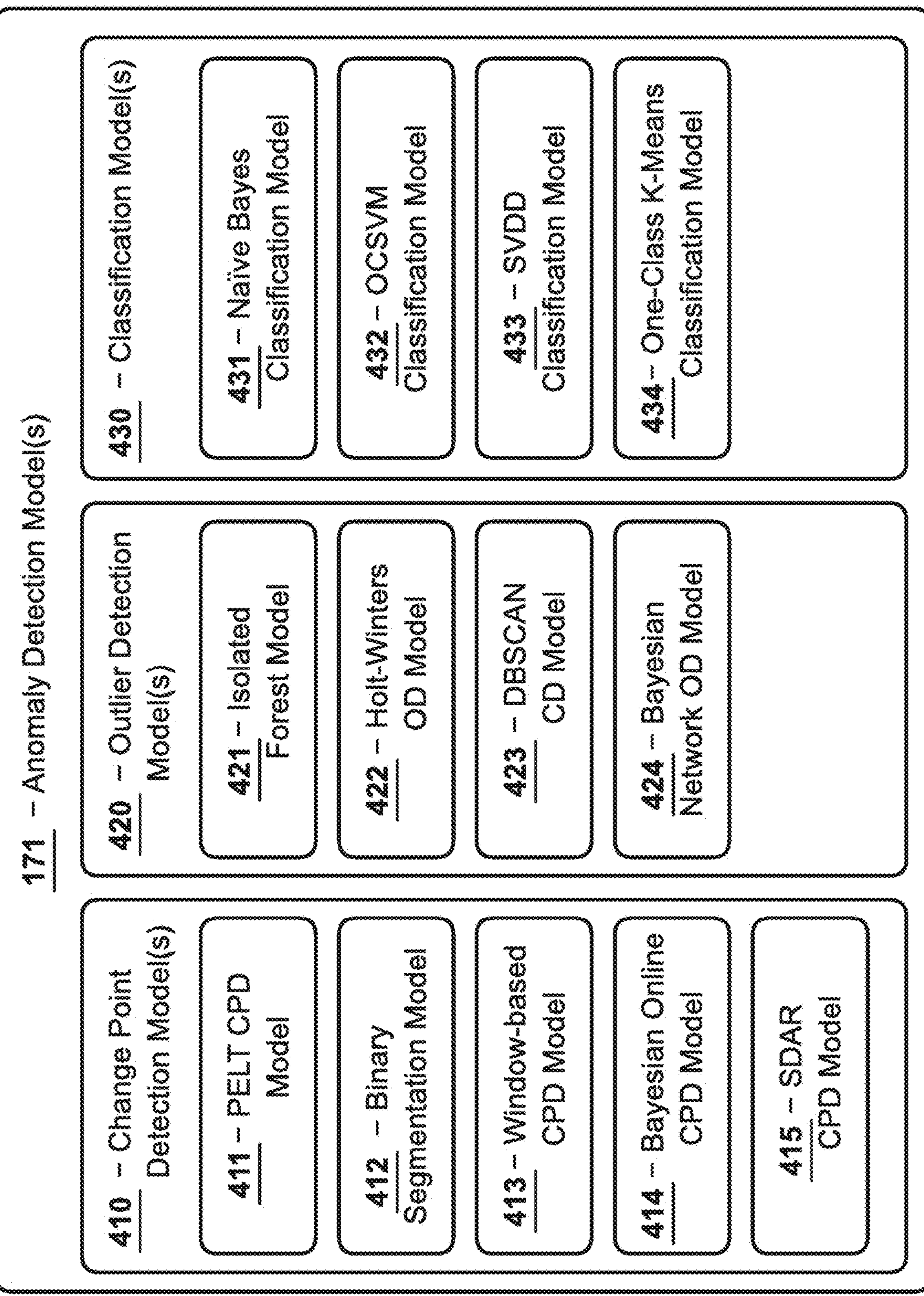
FIG. 4A is a block diagram illustrating exemplary anomaly detection models according to certain embodiments.

FIG. 4A is a block diagram illustrating exemplary types and configurations of anomaly detection models 171 that can be included in the machine learning network 160. Exemplary types of anomaly detection models 171 can include change point detection (CPD) models 410, outlier detection (OD) models 420, and/or classification models 430. These models can be configured to detect patterns indicative of changes in demand within each channel 180, and generate demand metrics 175 indicating or predicting abnormal changes in demand in each channel 180. As explained below, the change point detection (CPD) models 410, outlier detection (OD) models 420, and/or classification models 430 can utilize different techniques to accomplish these tasks.

The discussion below describes various types of change point detection (CPD) models 410, outlier detection (OD) models 420, and classification models 430 that can be incorporated into the machine learning network 160 to generate or predict demand metrics 175 corresponding to the current or real-time conditions in each of the channels 180. In some embodiments, a single one of these models can be utilized to monitor demand conditions in the channels 180 and generate demand metrics 175 corresponding to the channels 180. In other embodiments, the machine learning network 160 can include a plurality of these models that operate together, or in conjunction, to monitor demand conditions in the channels 180 and generate demand metrics 175 corresponding to the channels 180. For example, each of the models can be configured to analyze the impact of a specific channel feature 165 (or set of specific channel features 165) on the demand conditions in a channel 180, and generate a specific and unique type of demand metric 175 based on the specific channel feature 165. The unique demand metrics 175 generated by each of the models could then be combined to generate a final or cumulative demand metric for the channel 180.

In certain embodiments, one or more CPDs models 410 can be utilized to monitor demand conditions in each of the channels 180 and to generate demand metrics 175 corresponding to each of the channels 180. During training, the channel features 165 corresponding to each of the channels 180 can be accumulated over a series of time windows into training datasets to model demand conditions on the channels 180. In some scenarios, a separate or distinct training dataset can be generated for each channel 180 based on channel features 165 derived specifically from each channel 180. These training datasets can be utilized to train the CPD models 410 in an unsupervised fashion to detect demand changes in each of the channels 180.

The CPDs models 410 can be configured to learn or detect systematic shifts in the datasets which can be abrupt and/or meaningfully sustained that affect the demand conditions in each channel 180. For example, in some scenarios, the CPDs models 410 can be trained to detect or identify change points corresponding to time windows when one or more statistical properties of the datasets has changed significantly (e.g., which can be responsive to variations in population density, occurrences of events, and other changes in the channels 180). In some cases, the CPD models 410 can detect changes in the mean value, standard deviation, slope, and/or linear trend of the datasets corresponding to the demand conditions in each channel 180. During an operational phase when the CPD models 410 are deployed, the CPD models 410 can continuously or periodically receive and analyze sets of channel features 164 for each channel 180, which can permit the CPD models 410 to detect scenarios when the demand is significantly trending upward and downward, and to generate corresponding demand metrics 175 that indicate or predict the demand in each channel 180.

Various types of CPD models 410 can be incorporated into the machine learning network 160. In one example, a pruned exact linear time (PELT) CPD model 411 can be utilized either independently or in combination with other models discussed herein. In certain embodiments, the PELT CPD model 411 can identify shifts in the underlying datasets during training through minimization of a cost function over varying values and locations of change points within the data. The PELT CPD model 411 can detect both abrupt and gradual shifts in datasets corresponding to the channels 180, which can be useful for both detecting the large upward and downward spikes in demand in the channels 180 and generating demand metrics 175 with high precision. When deployed, the PELT CPD model 411 can receive a set of channel features 165 representing the current or real-time demand conditions for a given channel 180 and can utilize the channel features 165 to generate a corresponding demand metric 175 that indicates or predicts abnormal changes in the demand in the channel 180.

One of ordinary skill in the art would recognize that other types of CPD models 410 also could be utilized instead of, or in combination with, the PELT CPD model 411. For example, in some embodiments, the machine learning network 160 additionally, or alternatively, could include one or more binary segmentation CPD models 412, one or more window-based CPD models 413, one or more Bayesian online CPD models 414, and/or one or more sequentially discounting autoregressive (SDAR) CPD models 415. Similar to the PELT CPD model 411, each of these models can be trained in an unsupervised fashion using the training channel features to learn change point patterns corresponding to demand changes in each channel 180, and to generate demand metrics 175 representative of the demand conditions in each channel 180.

One or more OD models 420 can additionally, or alternatively, be utilized to monitor demand conditions in each of the channels 180 and to generate demand metrics 175 corresponding to each of the channels 180. Generally speaking, the OD models 420 can be trained in an unsupervised fashion using the channel feature datasets corresponding to the channels 180 to detect significant deviations in data points (or outliers) corresponding to changes in demand conditions in the channels 180. In some cases, the detected outliers can be responsive to upward or downward variations of population densities in a channel, weather conditions in the channel, occurrences of holidays, etc. Detection of the outliers can enable the OD models 420 to detect scenarios when the demand is significantly trending upward and downward, and to generate corresponding demand metrics 175 that indicate or predict the demand in the channel 180.

Various types of OD models 420 can be incorporated into the machine learning network 160. In some cases, an isolated forest (IF) OD model 421 may be trained to detect the data point variations in the datasets corresponding to the demand conditions in each channel 180. For each channel 180, the IF OD model 421 can utilize a decision tree structure to identify the data point variations that are rare or unique comparatively to a majority of other data points included in the corresponding dataset. The IF OD model 421 can detect these outliers, which are situated closer to the root of the tree structure (and isolated from other branches) and easier to separate in the tree from the majority of other data points. When deployed in an operational phase, the IF OD model 421 can receive a set of channel features 165 representing the current or real-time demand conditions for a given channel 180 and generate a corresponding demand metric 175 that indicates or predicts abnormal changes in the demand in the channel 180.

One of ordinary skill in the art would recognize that other types of OD models 420 also can be utilized instead of, or in combination with, the IF OD model 421. For example, in some embodiments, the machine learning network 160 additionally, or alternatively, could include one or more Holt-Winters OD models 422 (e.g., including Holt-Winters models with exponential smoothing), one or more density-based spatial clustering of applications with noise (DBSCAN) OD models 423, and/or one or more Bayesian network OD models 424. Similar to the IF OD model 421, each of these models can analyze the datasets comprising training channel features for each channel 180 to learn outliers or data point variation patterns that affect demand changes in each channel 180, and generate demand metrics 175 representative of the demand conditions in each channel 180.

One or more classification models 430 can additionally, or alternatively, be utilized to monitor demand conditions in each of the channels 180 and to generate demand metrics 175 corresponding to each of the channels 180. Generally speaking, the classification models 430 can be trained using supervised or semi-supervised training procedures 161. During training, separate sets of training features can be labeled with demand indicator labels, which identify anomalous training feature sets and/or which identify a demand metric corresponding to corresponding training feature sets. The labeled training feature sets can enable the classification models 430 to precisely learn demand-related patterns for each of the channels 180 and train the classification models 430 to classify a given set of channel features to a value for corresponding demand metric 175. When deployed in an operational phase, the classification models 430 can receive a set of channel features 165 representing the current or real-time demand conditions for a given channel 180 and generate a corresponding demand metric 175 that indicates or predicts abnormal changes in the demand in the channel 180.

Various types of classification models 430 can be incorporated into the machine learning network 160. In certain embodiments, a Naive Bayes (NBC) classification model 431 may be trained to detect patterns corresponding to changes in demand in each of the channels 180 based on the labeled sets of training features. The NBC classification model 431 can be a unary or one-class classification implementation that utilizes a probabilistic model to estimate a probability that a given set of channel features correspond to an anomalous scenario that represents a change in demand or predetermined level of demand. When deployed in an operational phase, the NBC classification model 431 can receive a set of channel features 165 representing the current or real-time demand conditions for a given channel 180, and assign a label that corresponds to a demand metric 175 indicating or predicting the demand in the channel 180.

One of ordinary skill in the art would recognize that other types of classification models 430 also can be utilized instead of, or in combination with, NBC classification models 431. For example, in some embodiments, the machine learning network 160 additionally, or alternatively, could include one or more one-class support vector machine (OCSVM) classification models 432, one or more support vector data description (SVDD) classification models 433, and/or one or more one-class K-means classification models 434. Similar to the NBC classification model 431, each of these models can be trained with training sets of labeled channel features to learn patterns indicative of demand changes in each channel 180, and generate a demand metric 175 representative of the demand conditions in each channel 180.

The aforementioned learning models are intended to provide examples of anomaly detection models 171 that can be included in the machine learning network 160 to generate demand metrics 175 for the current or real-time conditions in the channels 180. However, it should be recognized that other types of learning models also can be utilized.

Returning to FIGS. 1A and 1B, the machine learning network 160 also may include one or more demand prediction models 170 that are configured to predict or generate demand metrics 175 corresponding to future periods of time and/or based on future conditions in the channels 180. In certain embodiments, one or more time series forecasting models 172 can be utilized to generate these demand metrics 175. The time series forecasting models 172 can utilize various algorithms and techniques to predict or generate these demand metrics 175.

FIG. 4B is a block diagram illustrating exemplary types and configurations of time series forecasting models 172 that can be included in the machine learning network 160. The time series forecasting models 172 can be configured to predict demand metrics 175 on a per-channel basis for any desired future time period (e.g., a time window in a following hour, day, week, or month). In certain embodiments, historical channel features collected by the analytics platform 150 can be utilized to model consumer demand in each of the channels 180, and the time series forecasting models 172 can leverage this knowledge to predict future demand conditions in each of the channels 180.

Various types of time series forecasting models 172 can be incorporated into the machine learning network 160. In certain embodiments, one or more gradient boosting machine (GBM) forecasting models 441 can be utilized either independently or in combination with other models to model historical time series in each of the channels 180, and to generate demand metrics 175 predicting future demand in each of the channels 180. During training, a GBM forecasting model 441 can utilize historical channel features to train a plurality of weaker or smaller models in a gradual, additive, and sequential manner. These weaker models can be trained in a manner that optimizes a specified loss function, and they act in ensemble to learn a function for accurately predicting demand metrics 175 for each of the channels. When deployed in an operational phase, the GBM forecasting model 441 can receive inputs designating a specified future timeframe (e.g., such as 5-7 PM on the following day) and a specified channel 180 (e.g., such as Channel A corresponding to Acme Town) for a desired demand prediction, and the trained GBM forecasting model 441 can generate a demand metric 175 that predicts the demand for the specified channel 180 in the desired timeframe.

One of ordinary skill in the art would recognize that other types of time series forecasting models 172 also can be utilized instead of, or in combination with, GBM forecasting models 441. For example, in some embodiments, the machine learning network 160 additionally, or alternatively, could include one or more autoregressive integrated moving average (ARIMA) forecasting models 442, one or more seasonal autoregressive integrated moving average (SARIMA) forecasting models 443, one or more autoregressive recurrent neural network (ARNN) forecasting models 444, and/or one or more long short-term memory (LSTM) forecasting models 445. Similar to the GBM forecasting model 441, each of these models can be trained using historical channel features to predict demand metrics 175 for future time periods in each channel 180.

The aforementioned learning models are intended to provide examples of time series forecasting models 172 that can be included in the machine learning network 160 to predict demand metrics 175 for future conditions in the channels 180. However, it should be recognized that other types of learning models also can be utilized.

The various learning models discussed with respect to FIGS. 4A and 4B can be combined in various ways. In some embodiments, the machine learning network 160 can comprise at least one anomaly detection model 171 that is configured to generate demand metrics 171 based on current or real-time conditions in the channels 180 and at least one time series forecasting model 172 that is configured to generate demand metrics 171 that predict future demand conditions in the channels 180.

In certain embodiments, the machine learning network can execute multiple demand prediction models 170 that cooperate jointly to predict each of the demand metrics 175. This applies to demand metrics 175 generated for both current conditions in a channel 180 and future, predicted conditions in a channel 180. In many scenarios, using multiple demand prediction models 170 to generate each demand metric 175 can increase the accuracy and precision of the demand metrics 175.

A multitude of variables (or channel features 165 derived therefrom) can affect the demand conditions in a given channel, e.g., such as the population density, weather conditions, impact of scheduled events, and temporal information (e.g., the day or week, time of day, occurrences of holidays or seasons, etc.). Some demand prediction models 170 may require certain variables that are important for accurate prediction and not require other variables that are important for other demand predictions models. For example, certain types of demand prediction models can be well suited to analyze the impact of population density changes on demand conditions in the channel, but may be less optimal for analyzing the impact of weather or events on demand conditions within the channel. Likewise, certain types of demand prediction models 170 can be well suited for analyzing the impact of temporal information, and less optimal for analyzing the effects of weather conditions or other features. Therefore, to improve the accuracy and precision of the demand metrics 175, a plurality of demand prediction models 170 can be utilized to analyze separate variables that impact the conditions in a given channel, and these outputs of the prediction models can be combined, or jointly considered, in generating a final demand metric 175 for the channel 180.

In one example, multiple anomaly detection models 171 can be utilized in combination to generate the demand metrics 171 for the current or real-time conditions in the channels 180. For example a first demand prediction model 170, such as a PELT CPD model 411, can be trained and utilized to analyze and predict points in time in which some demand metric (e.g., population density) significantly shifted/changed its underlying historical pattern to create a new and sustained pattern. A second demand prediction model 170, such as an IF OD model, can be trained and utilized to analyze and predict globally anomalous points in time in which some demand metric (e.g., a bus schedule increasing stop frequency) suddenly and rapidly changed. A third demand prediction model 170 such as a NB classifier can be trained and utilized to analyze and predict occurrences/changes in some demand metric that have been previously observed and recorded. The outputs for each of these demand prediction models 170 can represent a value (or group of values) that represents the impact of a particular set of variables on the demand conditions in the channel 180. Each model may utilize different variables depending on the demand metric and type of prediction being made. The outputs of these demand prediction models 170 can be combined to jointly determine or predict a demand metric 175 for the channel 180.

The manner in which the outputs of the demand prediction models 170 are combined can vary. In some cases, the outputs of the demand prediction models 170 can be combined using a weighted combination function that applies weights to each of the outputs to generate a final demand metric 175 for the channel 180. Additionally, or alternatively, the outputs of the demand prediction models 170 can be combined by computing a mean or average of the output values, or by summing the values together. The outputs can be combined in various other ways as well.

Returning to FIGS. 1A and 1B, various training procedures 161 can be utilized to train each of the demand prediction models 170. Exemplary training procedures 161 can include supervised, unsupervised, and semi-supervised training procedures. The type of training procedures 161 applied can vary based on each type of demand prediction model 170. In some embodiments, the change point detection models 410 and outlier detection models 420 described herein can be trained using unsupervised training procedures 161, and classification models 530 and time series forecasting models 172 described herein can be trained using supervised or semi-supervised training procedures 161.

Figure 3A:
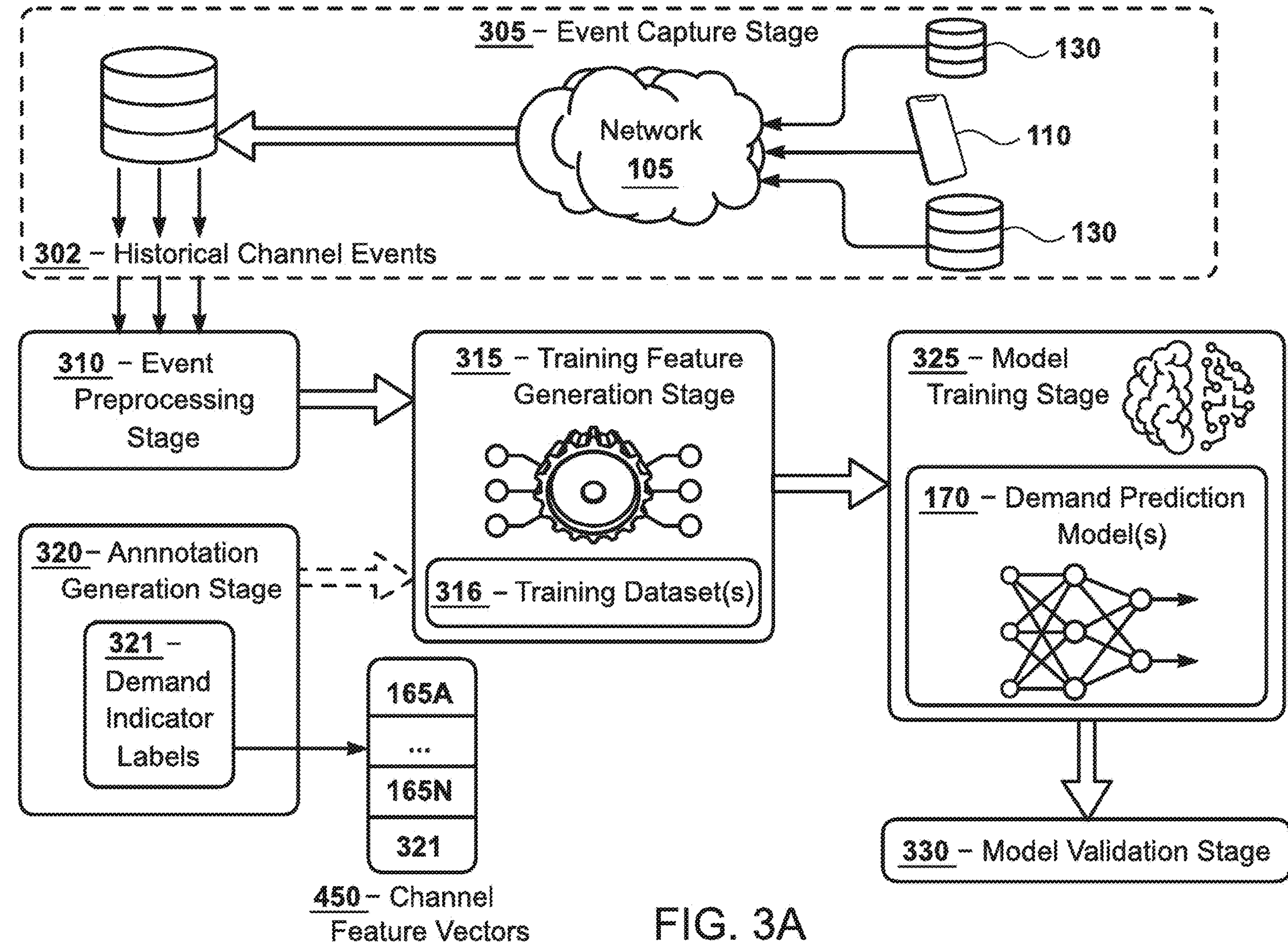
FIG. 3A is block flow diagram illustrating an exemplary training phase or training state of a machine learning network according to certain embodiments.

FIG. 3A is a block flow diagram illustrating an exemplary training phase 300A or training state of the machine learning network 160 in accordance with certain embodiments. In this training phase 300A, a training procedure 161 can be applied to any of the demand prediction models 170 described in this disclosure, as well as other learning models not specifically mentioned. As explained below, this training procedure can be varied slightly based on whether a given demand prediction model 170 is being trained in an unsupervised or supervised fashion.

In broad terms, the training procedure 161 can include, inter alia, an event capture stage 305, an event preprocessing stage 310, a training feature generation stage 315, a modeling training stage 325, and a model validation stage 330. For demand prediction models 170 that are trained in a supervised fashion, the training procedure 161 also may include an annotation generation stage 320.

In the event capture stage 305, channel events 185 corresponding to each of a plurality of channels 180 can be received and stored in one or more databases 301, which may include databases 301 that are maintained by, or accessible to, the analytics platform 150. At least a portion of the channel events 185 can be received over a network 105 from one or more external data sources 130 and/or computing devices 110 (e.g., mobile devices or smart phones) operated by individuals located in the channels 180. As explained above, the channel events 185 can include various types of data including, but not limited to, data location data 501, transaction data 502, merchant data 503, weather data 504, and/or event data 505. The channel events 185 can be stored and aggregated over a period of time (e.g., one month, six months, a year, etc.) to provide a dataset or collection of historical channel events 302.

In the event preprocessing stage 310, various preprocessing operations, including validation, extraction, and normalization operations, can be performed on the historical channel events 301. The historical channel events 302 can be stored as raw data that is accumulated from a variety of heterogeneous sources and stored in a variety of heterogeneous formats. The preprocessing operations applied in this stage can conform the data to a uniform or standardized format that is usable for later stages of the training procedure 161.

In the training feature generation stage 315, the channel features 165 are extracted and/or derived from the preprocessed historical channel events 302 to generate a training data set 316. As explained above, exemplary channel features 165 can include channel density features 451, channel device features 452, channel weather features 453, channel transaction features 454, channel event features 455, temporal features 456, and channel supply features 457. Other types of channel features 165 also can be generated. When used in the context of a training procedure 161, the channel features 165 can be referred to as "training channel features" in some portions of this disclosure.

Some of the training channel features 165 can be derived by analyzing and transforming the data corresponding to the channel events 185. For example, in some scenarios, a channel density feature 451 for a given channel can be generated by computing the number of devices located in a channel 180 based on the location data 501 in the historical channel events 302. Other training channel features 165 can be generated directly by extracting or filtering data from the historical channel events 302.

In some embodiments, separate groups or sets of training channel features 165 can be extracted that represent the demand conditions in a channel 180 at a given point in time. For example, a first set of training channel features (e.g., channel features 165A through 165N) can correspond to the demand conditions in Channel A at Time A, a second set of training channel features can correspond to the demand conditions in Channel A at Time B, a third set of training channel features can correspond to the demand conditions in Channel A at Time C, etc. Features can be extracted for each channel 180 in this manner.

Each set of training channel features can include some or all of the following: at least one channel density feature 451 for the channel 180, at least one channel device feature 452 for the channel 180, at least one channel weather feature 453 for the channel 180, at least one channel transaction feature 454 for the channel 180, at least one channel event feature 455 for the channel 180, at least one temporal feature 456 for the channel 180, and at least one channel supply feature 457 for the channel 180. Other types of training channel features can additionally, or alternatively, be used.

In certain embodiments, a separate channel feature vector 450 (or other data structure) can include or store each set of training channel features, and each channel feature vector 450 can be associated with a particular point in time in a channel 180. Thus, in some cases, a training dataset 316 can comprise multiple channel feature vectors 450 that can be used to collectively model or represent the demand conditions in a given channel 180 over the course of a specific time period.

In some embodiments, separate training datasets 316 can be generated on a channel-specific basis, such that each training dataset 316 comprises training channel features 165 and/or channel feature vectors 450 generated for a specific channel 180 (e.g., derived from historical channel events pertaining to the channel 180). Additionally, or alternatively, a training dataset 316 can be generated in a channel-agnostic fashion, such that the training dataset 316 comprises training channel features 165 and/or channel feature vectors 450 derived from various channels 180.

The annotation generation stage 320 can be applied to certain training procedures 161, such as those that use supervised or semi-supervised training techniques. The annotation generation stage 320 can annotate each channel feature vector 450 (or each set of channel features) with a demand indicator label 321, which identifies a demand associated with each training feature vector 450 (or each set of channel features). That is, each channel feature vector 450 can include a set of training channel features 165 that represent the conditions for a channel 180 at a given point in time, and the demand indicator label 321 can identify the demand based on those conditions. In some cases, the demand indicator labels 321 can be appended to, or included in, the feature vectors 450.

In the model training stage 325, one or more demand prediction models 170 can be trained (using the training datasets 316 generated in the previous stage) to predict demand metrics 175 for the channels 180. Certain demand prediction models 170, such as classification models 430 and time series forecasting models 172, can be trained in supervised or semi-supervised fashion using the training datasets 316 that are annotated with demand indicator labels 321. Other demand prediction models 170, such as change point detection models 410 and outlier detection models 420, can be trained in an unsupervised fashion using the training datasets 316 without labeling.

As explained above, the training datasets 316 can be generated on a channel-specific basis and/or a channel-agnostic basis. For example, for a channel-specific training dataset 316, a demand prediction model 170 can be trained to generate demand metrics 175 for Channel A based on training channel features 165 or channel feature vectors 450 that are derived directly from the channel events 175 corresponding to Channel A. For a channel-agnostic training dataset 316, a demand prediction model 170 can be trained to generate demand metrics 175 for Channel A based on training channel features that are derived from channel events from multiple channels (e.g., Channels A-Z).

In certain embodiments, using channel-specific training datasets 316 to train the demand prediction models 170 can permit the demand prediction models 170 to generate demand metrics 175 for each channel 180 with greater accuracy and precision. As discussed above, many different variables can impact or affect the demand in each of the channels 180. Additionally, the impact each variable has on a particular channel 180 can vary significantly. For example, negative weather conditions can heavily affect demand conditions in one channel, but may have little or no effect on the demand conditions in another channel. By segregating the channel features 165 into channel-specific training datasets 316, the demand prediction models 170 can be trained in a manner that is specific to each channel 180 and can separately learn how each variable affects the demand conditions in each channel 180.

In the model validation stage 350, the trained demand adjustment models 170 are tested and validated. Various changes can be implemented to enhance or hone the precision of the demand metrics 175 generated by the demand adjustment models 170.

Figure 3B:
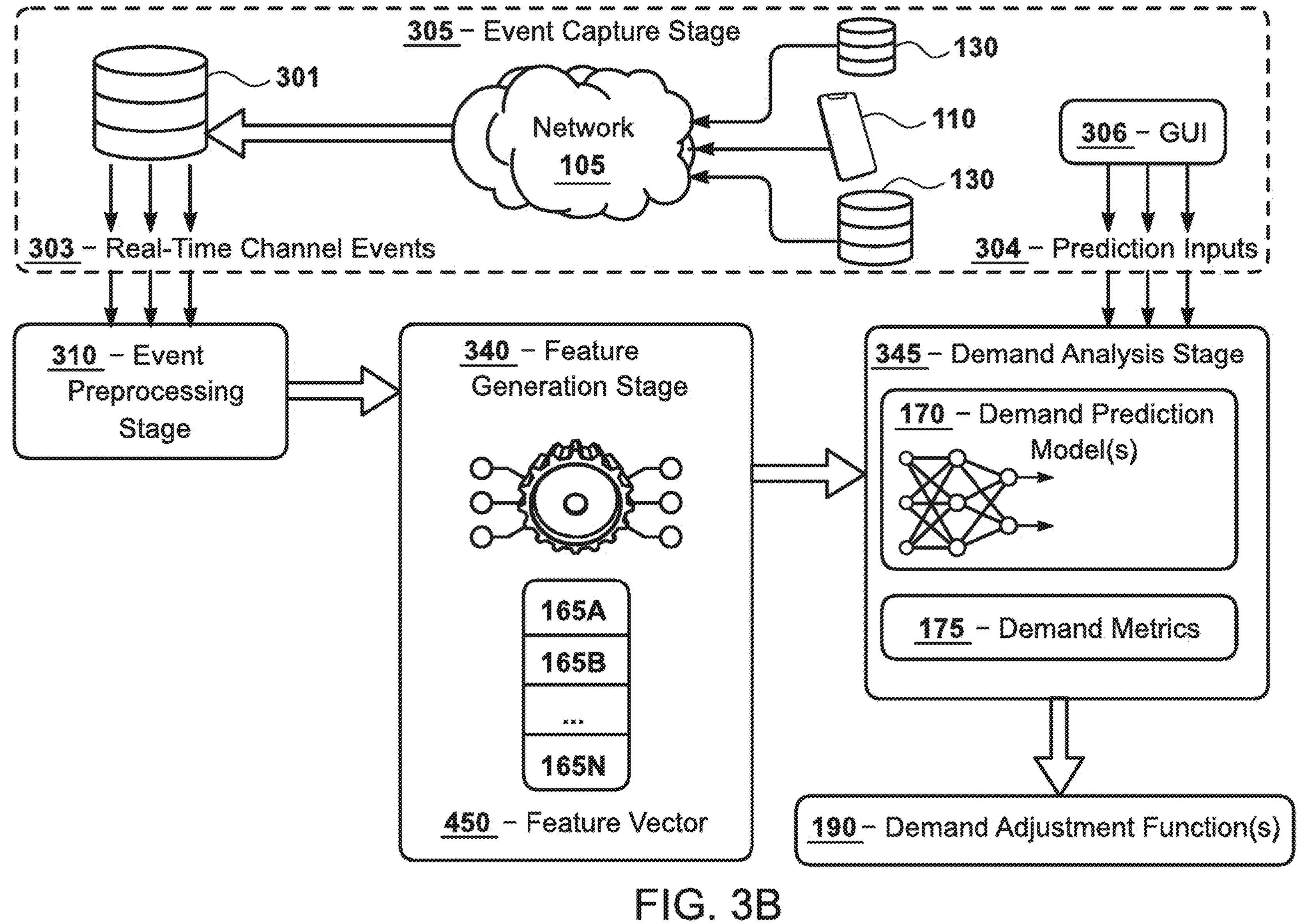
FIG. 3B is block flow diagram illustrating an exemplary operational phase or operational state of a machine learning network according to certain embodiments.

FIG. 3B is a block flow diagram illustrating an exemplary operational phase 300B or operational state of the machine learning network 160 in accordance with certain embodiments. In this operational phase or state, the machine learning network 160 can be deployed on the analytics platform 150 and can generate demand metrics 175, which can be made accessible directly on the analytics platform 150 and/or which can be provided to one or more client systems 140 that are interfaced with the analytics platform 150.

In broad terms, the operational phase 300B can include, inter alia, an event capture stage 305, an event preprocessing stage 310, a feature generation stage 340, and a demand analysis stage 345. Each of these are described below.

In the event capture stage 305, the same details described above with respect to FIG. 3A also apply generally in the operational phase 300B. For example, channel events 185 corresponding to the channels 180 can be received and stored in one or more databases 301 (e.g., databases 301 that are maintained by, or accessible to, the analytics platform 150). As explained above, the channel events 185 can include various types of data including, but not limited to, data location data 501, transaction data 502, merchant data 503, weather data 504, and/or event data 505. In the operational phase, the system is not necessarily concerned with aggregating the channel events 185, but rather is receiving and processing real-time channel events 303 that correspond to the current or real-time conditions in the channels 180.

In the event preprocessing stage 310, the same details described above with respect to FIG. 3A also apply generally in the operational phase 300B. Various preprocessing operations (e.g., validation, extraction, and normalization operations) can be performed on the real-time channel events 303 to conform the data to a uniform or standardized format is usable for later stages of the training procedure 161.

In the feature generation stage 340, the channel features 165 are extracted and/or derived from the real-time channel events 303. For example, a separate set of channel features 165 can be derived for each channel 180 based on the channel events 185 associated with each channel 180. Each set of channel features 165 can represent the current demand conditions in a corresponding channel 180. As explained above, exemplary channel features 165 can include channel density features 451, channel device features 452, channel weather features 453, channel transaction features 454, channel event features 455, temporal features 456, and channel supply features 457. Other types of channel features 165 also can be used.

In the demand analysis stage 345, one or more pre-trained demand prediction models 170 (e.g., one or more anomaly detection models 171) can receive the sets of channel features 165 and utilize the channel features 165 to generate separate demand metrics 175 for each of the channels 180. In certain embodiments, each demand metric 175 can indicate or predict the demand in a corresponding channel 180 for a current (or most recent) time period. The demand metrics 175 can be made accessible via the analytics platform (e.g., displayed on various GUIs) and/or can be transmitted to one or more client systems 140.

In the demand analysis stage 345, one or more pre-trained demand prediction models 170 (e.g., one or more times series forecasting models 172) can receive one or more prediction inputs 304 from an application, function, and/or graphical user interface (GUI) 306 associated with the analytics platform 150. In some cases, the prediction inputs 304 may specify a specific channel 180 and a specific timeframe in a future period of time, and the demand prediction models 170 can forecast or predict a demand metric 175 for the channel 180 at the future point in time. In some cases, the prediction inputs 304 can identify multiple channels and multiple future timeframes, and the demand prediction models 170 can separately forecast or predict the demand metric 175 for each combination of inputs.

Additionally, the demand metrics 350 (both real-time and predicted demand metrics 175) can be provided to, or utilized by, one or more demand adjustment functions 190. Exemplary demand adjustment functions 190 can utilize the real-time demand metrics 350 to adjust pricing in the channels 180 (e.g., to adjust pricing in particular verticals and/or to adjust pricing for particular inventory items).

Returning to FIGS. 1A and 1B, the one or more computing devices 110 can enable individuals to access the analytics platform 150 over the network 105 (e.g., over the Internet via a web browser application). For example, after a user account is established with the analytics platform 150, a user may utilize the analytics platform 150 to access to demand metrics 175 generated by the analytics platform 150. In some embodiments, a user may be provided with access to the demand metrics 175 generated across all of the channels 180. In other embodiments, a user may designate particular channels 180 of interest, and be provided access to demand metrics 175 for the designated channels 180. In some embodiments, a user also may designate particular verticals or industries of interest, and receive demand metrics 175 pertaining specifically to those verticals or industries.

The analytics platform 150 may generate various graphical user interfaces (GUIs) that display the demand metrics 175 and/or other associated data (e.g., channel event information, user account profiles, etc.), and these interfaces can be accessed via the user accounts. The interfaces provided by the analytics platform 150 also can include selectable options for configuring one or more deployment functions 195. The deployment functions 195 can permit users to leverage the demand metrics 175 (and other data generated by the analytics platform 150) for various purposes.

One exemplary deployment function 195 can include a notification function. The notification function enables users to configure the transmission of notifications in various scenarios. The notifications can be transmitted in various ways (e.g., via e-mail, cellular text messages, inbox messages on user accounts, data presented on GUIs, etc.) and the notifications can be sent to various devices (e.g., client systems 140, mobile or computing devices operated by individuals located in a channel 180, etc.).

In some cases, the notification function can be configured to periodically transmit notifications that include demand metrics 175 for desired channels 180, including demand metrics 175 for both current and future time periods. In this scenario, the notifications may provide daily, weekly, monthly and/or annual summaries of demand conditions relevant to specific users. The notification function also can be configured to send notifications in response to trigger events that are defined or configured by users. In this scenario, users (e.g., merchant users) may specify or define triggering criteria, and the analytics platform 150 may automatically send notifications to computing devices 110 and/or client systems 140 when specific trigger events are detected or predicted by the analytics platform 150 (e.g., in response to detecting or predicting a surge in a surge in demand in a channel 180). The notification function also can be configured to send notifications to consumer individuals (e.g., or their mobile devices) located within a channel 180. In this scenario, the notifications can include information about merchants located in a channel 180 and, in some cases, can include offers and discounts for various products and services.

Another exemplary deployment function 195 can include an interfacing function. The interfacing function can permit a user to interface the analytics platform 150 with various external applications and/or systems, thereby enabling those applications and/or systems to receive and utilize the demand metrics 175 (and any other data) generated by the analytics platform 150.

In some embodiments, one or more of applications running on, or operated by, the client systems 140 can be directly interfaced with the analytics platform 150 (e.g., via an application programming interface or API provided by the analytics platform 150). In some exemplary scenarios, an client system 140 may execute or provide a ride hailing application, a lodging booking application (e.g., hotel booking application), a dining reservation application (e.g., an application for scheduling dining reservations), a ticket booking application (e.g., for purchasing tickets to concerts, sporting games, and/or other events), a pricing application (e.g., an program that computes or determines prices for products and/or services), a staffing application (e.g., a program that schedules employees), and/or an inventory management application (e.g., a program that allocates inventory among different channels 180 or locations, places orders for new inventory, etc.). The interfacing function can connect the analytics system 150 to these applications (and other types of applications), thereby enabling the applications to directly receive the demand metrics 175 and utilize the demand metrics 175 to automate control of one or more functions (e.g., such as determining or adjusting pricing information, adjusting inventory allocations, initiating purchases of additional inventory, adjusting staffing at locations, etc.).

In one example, the deployment functions 195 can be utilized to implement surge pricing functions, which change or adjust the prices of products and/or services based on a supply and/or demand for those products and/or services. For example, the demand metrics 175 for a channel 180 can be used to dynamically adjust the pricing for hotel rooms, ride hailing services, parking garage spaces, and/or other types of inventory based on the demand for the inventory within the channel 180. These surge pricing functions can be automated by interfacing client systems 140 with the analytics platform 150 and/or they can be performed manually based on a review of the demand metrics 175 and related information.

In another example, the deployment functions 195 can be utilized by client systems 140 to reallocate inventory or resources based, at least in part, on the channel metrics 175. For example, a client system 140 that provides ride-sharing services can reallocate drivers to regions or areas where demand is higher and/or expected to be higher. Along similar lines, a client system 140 that is affiliated with a restaurant within a channel 180 can place orders for additional inventory and/or adjusting staffing in scenarios where demand is higher and/or expected to be higher. The demand metrics 175 and deployment functions 195 can be utilized in many others ways to enhance operations of merchants within the channels 180.

Figure 2:
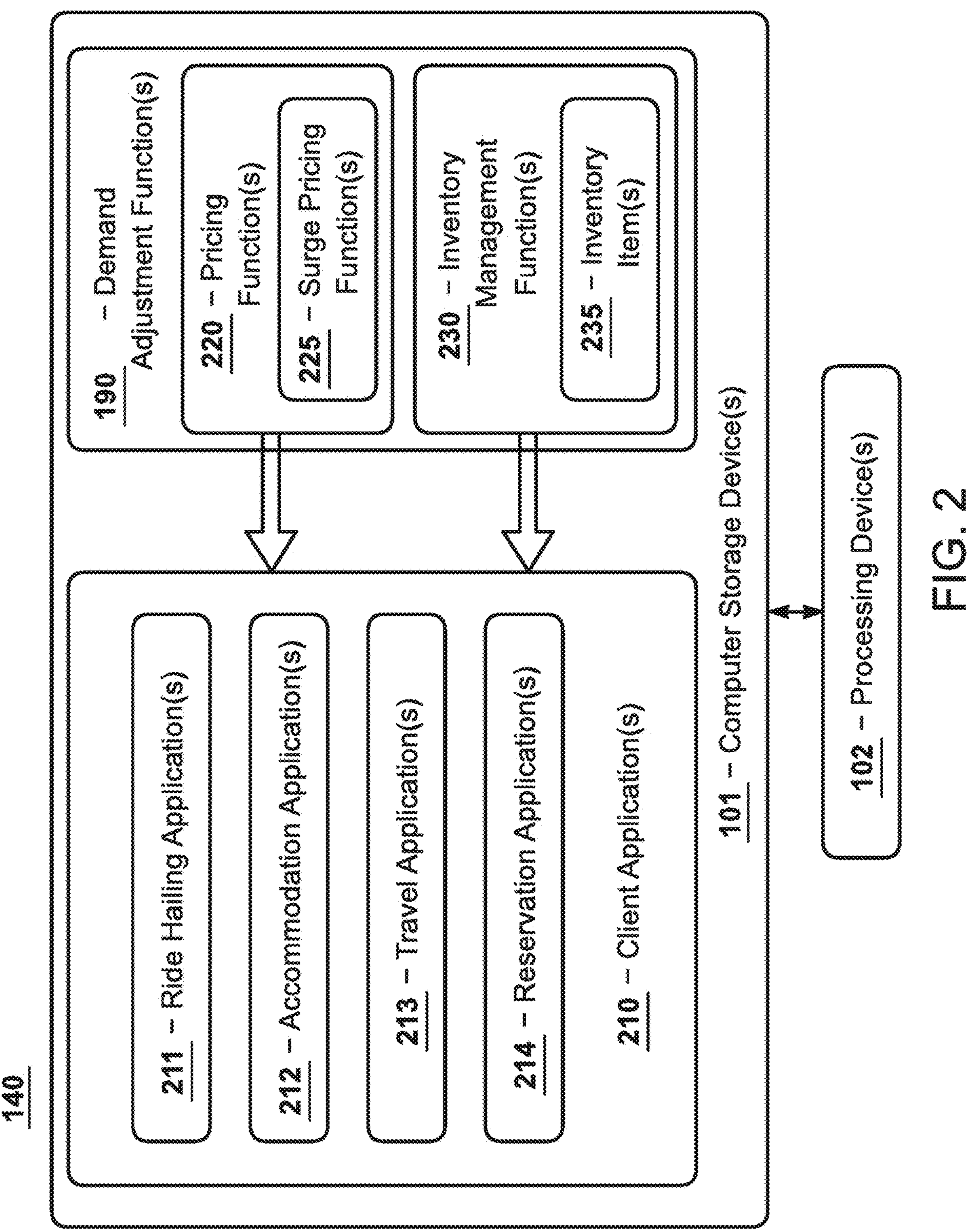
FIG. 2 is a block diagram illustrating an exemplary client system according to certain embodiments.

FIG. 2 is a block diagram illustrating exemplary features, components, and/or functions of a client system 140 according to certain embodiments. The client system 140 can include one or computing devices 110 and/or one or more servers 120, each of which includes one or more computer storage devices 101 and one or more processor devices 102. The client system 140 can host and execute one or more client applications 610.

Exemplary client applications 210 provided by a client system 140 can include one or more of the following: 1) a ride hailing application 211 (e.g., an application that connects passengers with drivers to schedule rides); 2) an accommodation application 212 (e.g., an application that permits guests to schedule rooms or lodging); 3) a travel application 213 (e.g., an application that permits individuals to book or schedule transportation with airlines, trains, buses, boats, etc.); and 4) a reservation application 214 (e.g., an application that permits individuals to schedule reservations or tickets for restaurants, concerts, events, bars, parking spaces, and/or other venues). Other types of client applications 210 also may be hosted and executed by the client systems 140. In certain embodiments, the client applications 210 can represent web-based applications that are accessible via a web browser and/or local applications (e.g., mobile apps) that is installed on devices (e.g., mobile devices or smart phones) operated by end-users.

The demand metrics 175 can be utilized to enhance various functionalities of the client applications 210. In some scenarios, the demand metrics 175 can be utilized to enhance or implement one or more demand adjustment functions 190, such as a pricing function 220 and/or an inventory management function 230, for each of the client applications 210. The demand adjustment functions 190 can be configured to adjust pricing and/or inventory information for inventory items 235 (e.g., products and/or services) based on actual or predicted supply metrics and/or demand metrics for the inventory items 235. The pricing function 220 and/or inventory management function 230 can be included within the functionality of each of the client applications 210, or can be included in separate applications that communicate with the client applications 210.

The pricing function 220 can utilize the demand metrics 175 to determine pricing for one or more inventory items 235, which may generally include any type of product or service made available by a client application 210. For example, depending on the functionality of a given client application 210, the pricing function 220 can determine pricing for ride hailing services, taxi services, lodging accommodations, event tickets (e.g., for sporting events or concerts), airline tickets, train tickets, packing spaces, etc.

In some scenarios, the demand metrics 175 can be utilized to implement a surge pricing function 225 for one or more of the client applications 210. A surge pricing function 225 generally represents a function that adjusts the price of one or more inventory items 235 based on the demand for the inventory items 235 (e.g., based on a comparison of the supply and the demand for the inventory items 235). The demand metrics 175 (and/or other data) generated by the analytics platform 150 may be utilized to dynamically adjust the pricing of one or more inventory items 235 offered by each of the client applications 210.

The inventory management function 230 can utilize the demand metrics 175 to manage or adjust inventory items 235 in various ways. For example, the inventory management function 230 can detect when additional inventory items 235 should be ordered to accommodate a current demand for inventory items 235 and/or a predicted future demand for inventory items 235. In some scenarios, the inventory management function 230 also can be configured to automatically place an order for additional inventory items 235 to accommodate a spike in a current or predicted demand for the inventory items 235.

The inventory management function 230 also can reallocate inventory items 235 to accommodate varying supply and demand metrics across different channels 180 and/or within a given channel 180. For example, in some scenarios, a merchant may have multiple business locations, including multiple locations within a given channel 180 and multiple locations situated outside the channel 180. The inventory management function 230 can utilize the demand metrics 175 to dynamically reallocate inventory items 235 among the business locations within the given channel 180 to accommodate the varying demands at those locations and/or to maximize sales of inventory items 235 across all locations. Similarly, the inventory management function 230 can utilize the demand metrics 175 to dynamically reallocate inventory items 235 from a location in one channel 180 to one or more separate channels 180 in order to accommodate the varying demands in each channel 180 and/or to maximize sales of inventory items 235 across all channels 180.

In certain embodiments, the client applications 210 can additionally, or alternatively, be stored on and executed by the analytics platform 150. Similarly, the demand adjustment functions 190 (e.g., including the pricing function 220, the surge pricing function 225, and/or the inventory management function 630230 can be stored on and executed by the analytics platform 150.

Figure 6:
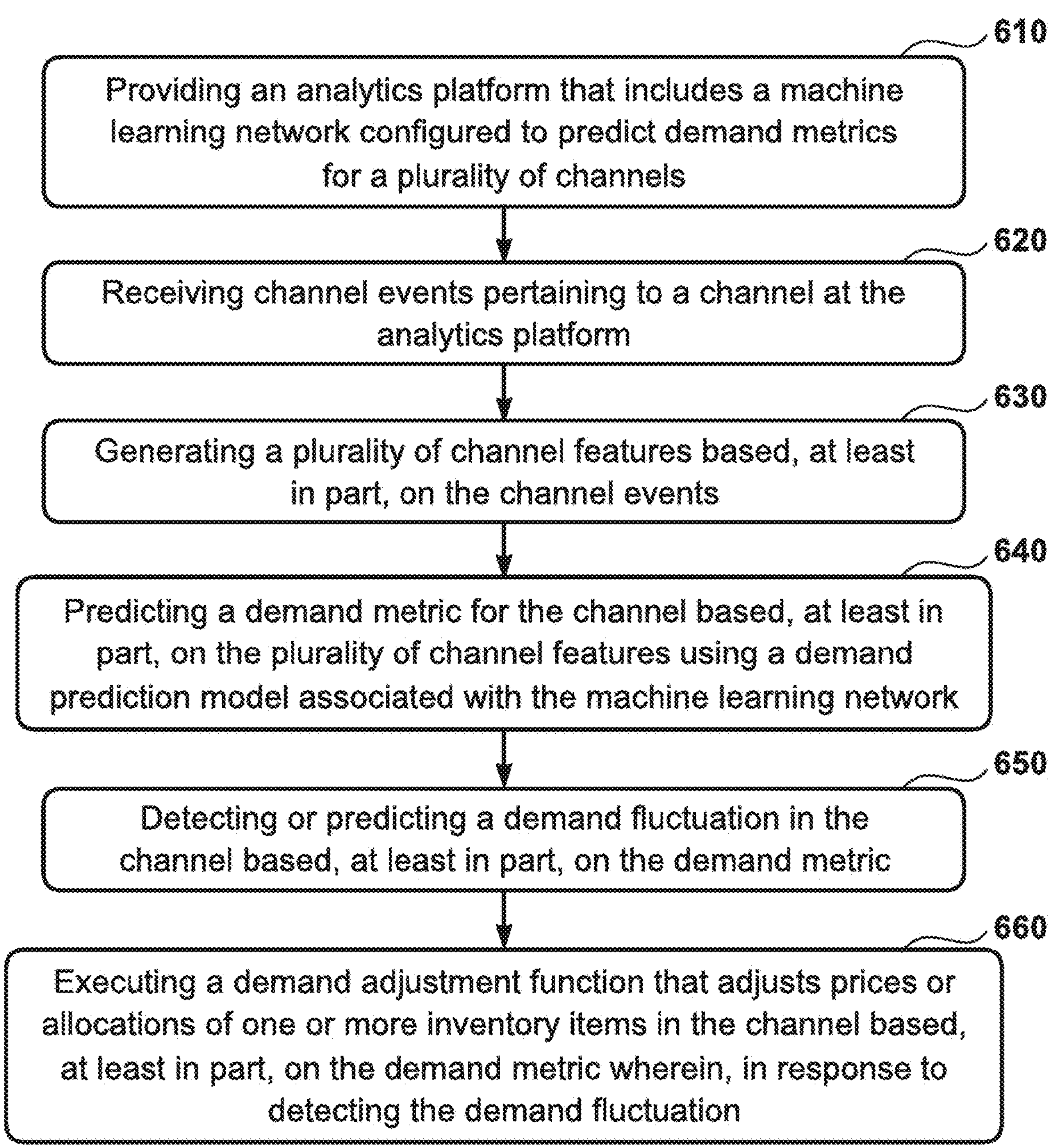
FIG. 6 is a flowchart illustrating an exemplary method according to certain embodiments.

FIG. 6 illustrates a flow chart for an exemplary method 600 according to certain embodiments. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, system 100, client system 140, analytics platform 150, and/or machine learning network 160 can be configured to perform method 600 and/or one or more of the steps of method 600. In these or other embodiments, one or more of the steps of method 600 can be implemented as one or more computer instructions configured to run at one or more processing devices 102 and configured to be stored at one or more non-transitory computer storage devices 101. Such non-transitory memory storage devices 101 can be part of a computer system such as system 100, client system 140, analytics platform 150, and/or machine learning network 160.

In step 610, an analytics platform 150 is provided that includes a machine learning network 160 configured to predict demand metrics 175 for a plurality of channels 180. Each channel 180 can correspond to a geographic area. The machine learning network 160 can be configured to predict demand metrics 175 corresponding to current or real-time conditions in the channels 180. The machine learning network 160 additionally, or alternatively, can be configured to predict demand metrics 175 corresponding to future conditions in the channels 180

In step 620, channel events 185 pertaining to a channel 180 are received by the analytics platform. Various types of channel events 185 can be received by the analytics platform 150 over a network 105 (e.g., the Internet and/or other networks). The channel events 185 pertaining to the channel 180 can generally include any data relating to monitoring present or future conditions associated with the channel 180. Exemplary channel events 185 can include location 501, transaction data 502, demographic data 503, merchant data 504, weather data 505, and/or event data 506 described above. The channel events 185 can be received from various sources including, but not limited, to computing devices 110 (e.g., mobile devices) operated by individuals in the channel 180, one or more external data sources 130, one or more client systems 140, and/or one or more applications or functions executed on the analytics platform 150.

In step 630, a plurality of channel features 165 are generated based, at least in part, on the channel events 185. The channel features 165 can generally include any data that can impact or affect demand conditions in the channel 180. At least a portion of the channel features 165 can be extracted and/or derived from the channel events 185 received by the analytics platform 150. Exemplary channel features 165 can include the channel density features 451, channel device features 452, channel weather features 453, channel transaction features 454, channel event features 455, temporal features 456, and/or channel supply features 457 described above. In some embodiments, at least a portion of the channel features 165 can be incorporated into a feature vector 450 that captures the demand conditions for channel 180 at a given point in time.

In step 640, a demand metric 175 for the channel 180 is predicted based, at least in part, on the plurality of channel features 165 using a demand prediction model 170 associated with the machine learning network 160. The demand metric 175 can indicate or predict the demand in the channel 180 for a current or future time period. As described above, various demand prediction models 170 can be utilized to predict the demand metric 175 including, but not limited to, anomaly detection models 171 (e.g., such as change point detection models 410, outlier detection models 420, and classification models 430) and time series forecasting models 172. In some embodiments, the demand prediction model 170 predicts a demand metric 175 for a current period of time and the channel features 165 generated for the current period of time are utilized to generate the demand metric 175. Additionally, or alternatively, the demand prediction model 170 predicts a demand metric 175 for a future period of time based on a historical modeling of consumer demand that is derived from channel features 165.

In step 650, a demand fluctuation 194 in the channel 180 is detected or predicted based, at least in part, on the demand metric 175. The demand fluctuation 194 can represent an upward or downward change in the demand. The demand metric 175 can be utilized to detect a demand fluctuation 194 in a current time period and/or can be utilized to predict a demand fluctuation in a future time period.

In step 660, a demand adjustment function 190 is executed in response to detecting the demand fluctuation that adjusts prices or allocations of one or more inventory items in the channel 180 based, at least in part, on the demand metric 175. The demand adjustment function 190 can be executed by the analytics platform 150 and/or one or more client systems 140 in communication with the analytics platform 150. The one or more inventory items can generally correspond to any product or service that is offered in the channel. In certain embodiments, the demand adjustment function 190 can correspond to a surge pricing function that dynamically adjust prices for the one or more inventory items based, at least in part, on a demand for the one or more inventory items in the channel. Additionally, or alternatively, the demand adjustment function 190 can correspond to an inventory management function that can reallocate the one or more inventory items based, at least in part, on the demand for the one or more inventory items.

The techniques described in this disclosure provide a technical solution (e.g., that utilizes improved AI and machine learning networks) for overcoming the aforementioned limitations of existing systems. This technology-based solution marks an improvement over existing capabilities and functionalities related to determining or predicting demand in multiple channels.

In certain embodiments, the techniques described herein can be utilized continuously at a scale that cannot be reasonably performed using manual techniques or the human mind. For example, in many embodiments, real-time information from large numbers of channels or geographic areas can be simultaneously processed and analyzed to provide real-time updates to client systems. This simultaneous processing of real-time data in this manner cannot be performed by a human mind.

Additionally, in certain embodiments, the techniques described herein solve a technical problem that arises only within the realm of computer networks, as AI and machine learning networks or architectures do not exist outside the realm of computer networks.

In certain embodiments, a system comprises one or more processors and one or more non-transitory computer-readable storage devices storing computing instructions configured to run on the one or more processors and cause the one or more processors to execute functions comprising: providing access to an analytics platform that includes a machine learning network configured to predict demand metrics for a plurality of channels; receiving, by the analytics platform, channel events pertaining to a channel; generating a plurality of channel features based, at least in part, on the channel events; and predicting, using a demand prediction model associated with the machine learning network, a demand metric for the channel based, at least in part, on the plurality of channel features; wherein a demand adjustment function is executed that adjusts prices or allocations of one or more inventory items in the channel based, at least in part, on the demand metric.

A method is implemented via execution of computing instructions by one or more processors and stored on one or more non-transitory computer-readable storage devices. The method comprises: providing access to an analytics platform that includes a machine learning network configured to predict demand metrics for a plurality of channels; receiving, by the analytics platform, channel events pertaining to a channel; generating a plurality of channel features based, at least in part, on the channel events; and predicting, using a demand prediction model associated with the machine learning network, a demand metric for the channel based, at least in part, on the plurality of channel features; wherein a demand adjustment function is executed that adjusts prices or allocations of one or more inventory items in the channel based, at least in part, on the demand metric.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A system for forecasting demand using a machine-learning architecture comprising: one or more processors; and one or more non-transitory computer-readable storage devices storing computing instructions configured to run on the one or more processors and cause the one or more processors to execute functions comprising: providing access to an analytics platform that includes a machine learning architecture comprising one or more forecasting models configured to predict demand metrics for future time periods across a plurality of channels corresponding to geographic regions, wherein: the one or more forecasting models include a time series forecasting model; during a training stage, the time series forecasting model is trained on a training dataset comprising time series data that models demand conditions in one or more channels using a sequence of training channel feature sets that correspond to successive time windows in the one or more channels; during the training stage, the time series data is processed to optimize a loss function corresponding to the time series forecasting model, and learn a prediction function that generates the demand metrics for the future time periods; during the training stage, each of the training channel feature sets are annotated with demand indicator labels comprising demand values which indicate the demand in the one or more channels in each successive time window based on the demand conditions represented in each of the training channel feature sets; and during the training stage, the time series forecasting model is trained in a supervised manner utilizing the time series data and the demand indicator labels; receiving input parameters for a future demand prediction that designate a future time period and a channel corresponding to a geographic region; receiving, by the analytics platform, channel events associated with the designated channel, wherein the channel events include data indicative of the demand conditions within the geographic region corresponding to the channel during at least one previous time period or a current time period; extracting a plurality of channel features based, at least in part, on the channel events for the at least one previous time period or the current time period; and predicting, by the one or more forecasting models of the machine learning architecture, a demand metric for the future time period in the channel based, at least in part, on the plurality of channel features.

2. The system of claim 1, wherein the time series forecasting model generates the demand metric using one or more of: a (GBM) gradient boosting machine forecasting model; an ARIMA (Autoregressive Integrated Moving Average) forecasting model; a SARIMA (Seasonal Autoregressive Integrated Moving Average) forecasting model; an ARNN (Autoregressive Recurrent Neural Network) forecasting model; or a LSTM (Long Short-Term Memory) forecasting model.

3. The system of claim 1, wherein a demand adjustment function is executed that adjusts prices or allocations of one or more inventory items offered in the channel based, at least in part, on the demand metric.

4. The system of claim 1, wherein the plurality of channel features extracted from the channel events include at least three of: (a) a channel density feature derived from channel events indicating a density or quantity of individuals located in the channel; (b) a live event feature derived from channel events indicating one or more live events occurring within the channel or scheduled to occur within the channel; (c) a channel weather feature that is derived from channel events corresponding to present or future weather conditions within the channel; (d) a channel supply feature derived from channel events corresponding to a current or future supply of inventory items in the channel; and (e) a temporal channel feature that accounts for time-based demand variations in the channel that are attributable to at least one of: a time of day, a day of week, a season, or a holiday; wherein the plurality of channel features are received as an input to the one or more forecasting models of the machine learning architecture, and a prediction function learned by the one or more forecasting models during a training stage is utilized to output the demand metric for the future time period in the channel.

5. The system of claim 1, wherein the demand metric is provided to a surge pricing function, and the surge pricing function dynamically adjusts pricing for one or more inventory items in the channel during the future time period based, at least in part, on the demand metric.

6. The system of claim 1, wherein: the demand metric generated by the one or more forecasting models predicts the demand for a ride-hailing service in the geographic region corresponding to the channel; the demand metric is received by a ride-hailing application that connects passengers with drivers; and the ride-hailing application utilizes the demand metric to adjust pricing for the ride-hailing service and/or reallocate drivers associated with the ride-hailing service to different geographic regions.

7. The system of claim 1, wherein: the demand metric generated by the one or more forecasting models predicts the demand for lodging accommodations in the geographic region corresponding to the channel; the demand metric is received by an accommodation application that facilitates booking of the lodging accommodations corresponding to at least one of: hotel or motel accommodations, short-term home stay accommodations, or property rental services; and the accommodation application utilizes the demand metric to adjust pricing and/or allocations corresponding to the lodging accommodations.

8. The system of claim 1, wherein: the demand metric generated by the one or more forecasting models predicts the demand for travel services in the geographic region corresponding to the channel; the demand metric is received by a travel application that facilitates booking of transportation services, including tickets or reservations corresponding to at least one of: airline services, train services, bus services, cruise services, or boat services; and the travel application utilizes the demand metric to adjust pricing and/or inventory allocations corresponding to the transportation services.

9. The system of claim 1, wherein: the demand metric generated by the one or more forecasting models predicts the demand for reservations in the geographic region corresponding to the channel; the demand metric is received by a reservation application that facilitates scheduling of the reservations for at least one of: a restaurant located in the channel, a tavern located in the channel, or a venue located in the channel; and the demand metric is utilized by the reservation application to adjust pricing and/or inventory allocations corresponding to the reservations.

10. The system of claim 1, wherein: the demand metric generated by the one or more forecasting models predicts the demand for ticketed events in the geographic region corresponding to the channel; the demand metric is received by a ticket application that facilitates procurement of tickets for at least one of: concerts, sporting events, theater performances, or exhibitions; and the ticket application utilizes the demand metric to adjust pricing and/or ticket allocations corresponding to the ticketed events.

11. The system of claim 1, wherein: the demand metric generated by the one or more forecasting models predicts the demand for parking services in the geographic region corresponding to the channel; the demand metric is received by a parking service application that facilitates booking of parking spaces; and the parking service application utilizes the demand metric to adjust pricing and/or allocations of parking services within the channel.

12. The system of claim 1, wherein: the demand metric generated by the one or more forecasting models is received by an e-commerce application that facilitates sales of inventory items; and the demand metric is utilized by the e-commerce application to adjust pricing and/or inventory allocations corresponding to the inventory items.

13. The system of claim 1, wherein: the demand metric generated by the one or more forecasting models is received by an inventory management application; and the demand metric is utilized by the inventory management application to allocate inventory items among a plurality of channels and/or to replenish inventory.

14. The system of claim 1, wherein: the demand metric generated by the one or more forecasting models is received by a pricing application; and the demand metric is utilized by the pricing application to determine prices for products and/or services.

15. The system of claim 1, wherein: the demand metric generated by the one or more forecasting models is received by a staffing application; and the demand metric is utilized by the staffing application to adjust staffing schedules or staffing allocations at one or more business locations.

16. A method implemented via execution of computing instructions by one or more processors and stored on one or more non-transitory computer-readable storage devices, the method comprising: providing access to an analytics platform that includes a machine learning architecture comprising one or more forecasting models configured to predict demand metrics for future time periods across a plurality of channels corresponding to geographic regions, wherein: the one or more forecasting models include a time series forecasting model; during a training stage, the time series forecasting model is trained on a training dataset comprising time series data that models demand conditions in one or more channels using a sequence of training channel feature sets that correspond to successive time windows in the one or more channels; during the training stage, the time series data is processed to optimize a loss function corresponding to the time series forecasting model, and learn a prediction function that generates the demand metrics for the future time periods; during the training stage, each of the training channel feature sets are annotated with demand indicator labels comprising demand values which indicate the demand in the one or more channels in each successive time window based on the demand conditions represented in each of the training channel feature sets; and during the training stage, the time series forecasting model is trained in a supervised manner utilizing the time series data and the demand indicator labels; receiving input parameters for a future demand prediction that designate a future time period and a channel corresponding to a geographic region; receiving, by the analytics platform, channel events associated with the designated channel, wherein the channel events include data indicative of the demand conditions within the geographic region corresponding to the channel during at least one previous time period or a current time period; extracting a plurality of channel features based, at least in part, on the channel events for the at least one previous time period or the current time period; and predicting, by the one or more forecasting models of the machine learning architecture, a demand metric for the future time period in the channel based, at least in part, on the plurality of channel features.

17. A computer program product comprising one or more non-transitory storage devices that store instructions for causing one or more processing devices to perform functions comprising: providing access to an analytics platform that includes a machine learning architecture comprising one or more forecasting models configured to predict demand metrics for future time periods across a plurality of channels corresponding to geographic regions, wherein: the one or more forecasting models include a time series forecasting model; during a training stage, the time series forecasting model is trained on a training dataset comprising time series data that models demand conditions in one or more channels using a sequence of training channel feature sets that correspond to successive time windows in the one or more channels; during the training stage, the time series data is processed to optimize a loss function corresponding to the time series forecasting model, and learn a prediction function that generates the demand metrics for the future time periods; during the training stage, each of the training channel feature sets are annotated with demand indicator labels comprising demand values which indicate the demand in the one or more channels in each successive time window based on the demand conditions represented in each of the training channel feature sets; and during the training stage, the time series forecasting model is trained in a supervised manner utilizing the time series data and the demand indicator labels; receiving input parameters for a future demand prediction that designate a future time period and a channel corresponding to a geographic region; receiving, by the analytics platform, channel events associated with the designated channel, wherein the channel events include data indicative of the demand conditions within the geographic region corresponding to the channel during at least one previous time period or a current time period; extracting a plurality of channel features based, at least in part, on the channel events for the at least one previous time period or the current time period; and predicting, by the one or more forecasting models of the machine learning architecture, a demand metric for the future time period in the channel based, at least in part, on the plurality of channel features.

* * * * *